(12) United States Patent
Barker et al.

(10) Patent No.: US 12,282,825 B2
(45) Date of Patent: *Apr. 22, 2025

(54) TOOL CONTROL PROGRAM SYSTEM AND METHOD OF TOOL CONTROL

(71) Applicant: Innova Zones LLC, Irving, TX (US)

(72) Inventors: Travis Brian Barker, Dallas, TX (US); Zack Suther, Southlake, TX (US)

(73) Assignee: Innova Zones LLC, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,925

(22) Filed: Jan. 29, 2024

(65) Prior Publication Data

US 2024/0169171 A1    May 23, 2024

Related U.S. Application Data

(63) Continuation of application No. 18/158,856, filed on Jan. 24, 2023, now Pat. No. 11,900,209.

(60) Provisional application No. 63/302,438, filed on Jan. 24, 2022.

(51) Int. Cl.
*G06K 7/14* (2006.01)
*G05B 19/4065* (2006.01)
*G06K 7/10* (2006.01)

(52) U.S. Cl.
CPC ....... *G06K 7/1417* (2013.01); *G05B 19/4065* (2013.01); *G06K 7/10732* (2013.01)

(58) Field of Classification Search
CPC .. G06K 7/1417; G06K 7/1032; G06K 7/1413; G06K 7/10861; G06K 7/10722; G06K 19/06037; G05B 19/4065

USPC ............. 235/462.09, 462.1, 462.01
See application file for complete search history.

(56) References Cited

U.S. PATENT DOCUMENTS

| | | |
|---|---|---|
| 8,533,075 B1 | 9/2013 | Sayers, III et al. |
| 8,756,124 B1 | 6/2014 | Sayers, III et al. |
| 2016/0179909 A1 | 6/2016 | Wells et al. |
| 2020/0258430 A1 | 8/2020 | Wolff et al. |
| 2020/0405437 A1 | 12/2020 | Shelton, IV et al. |
| 2023/0237291 A1 | 7/2023 | Barker et al. |

OTHER PUBLICATIONS

File History for U.S. Appl. No. 18/158,856, filed Jan. 24, 2023, now published as US2023-237291, inventors Barker et al.

*Primary Examiner* — Edwyn Labaze
(74) *Attorney, Agent, or Firm* — DeWitt LLP

(57) ABSTRACT

A system and method of a tool control program that provides real-time tracking of critical data points relating to production tools between the point of issuance to a designated user to the point of return of each production tool by the designated user, including intermediate events such as sharpening, repair and damage analysis, whereby each critical data point is capable of being linked to a unique asset number assigned to each production tool and a unique designated user number in real-time providing for management, regulatory compliance and/or employee accountability relating to each production tool. The tool control program having an integrated software relating to scanning production tools in relation to the critical data points, such that real-time data analytics can be obtained and utilized for risk management and asset visibility.

21 Claims, 24 Drawing Sheets

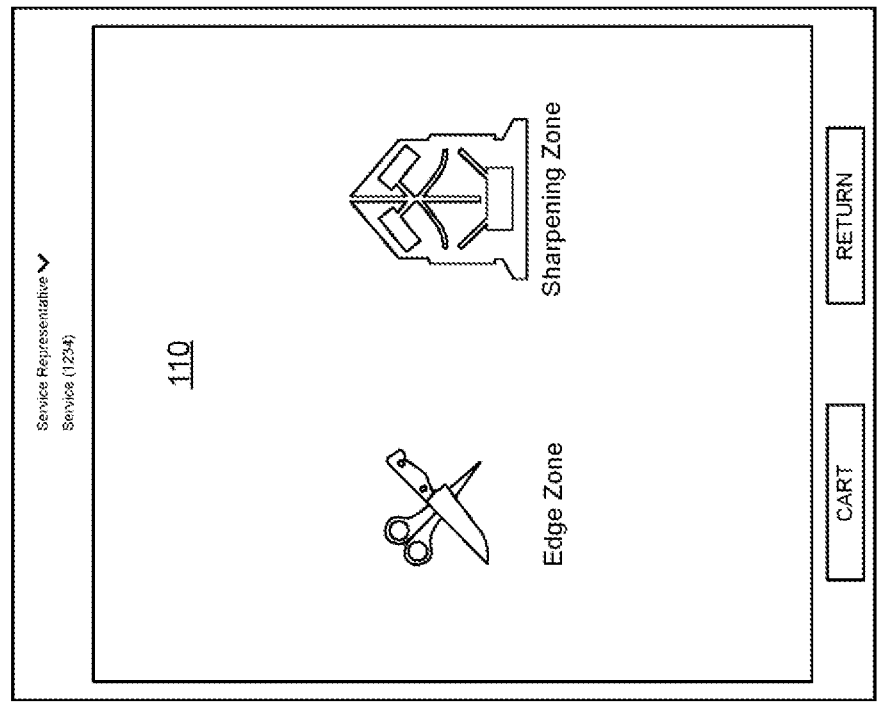
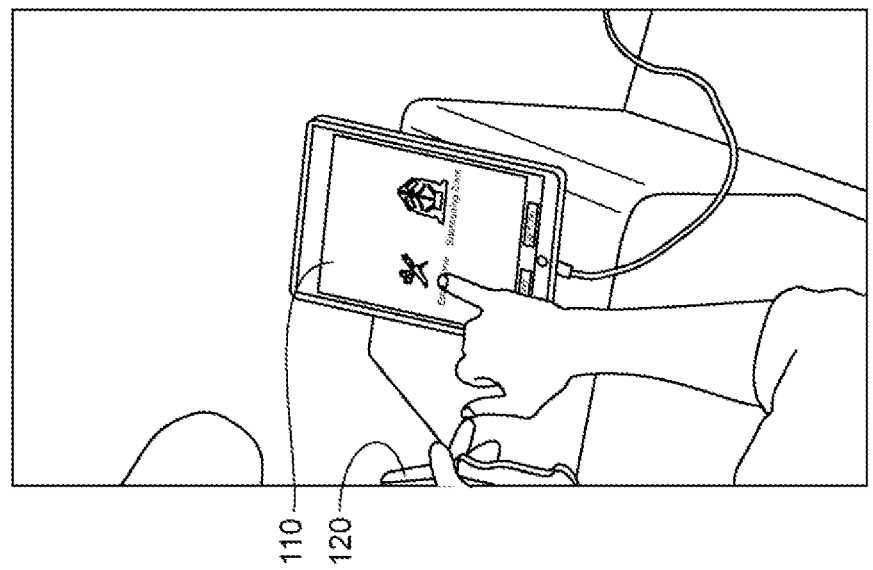
FIG. 5B
FIG. 5A

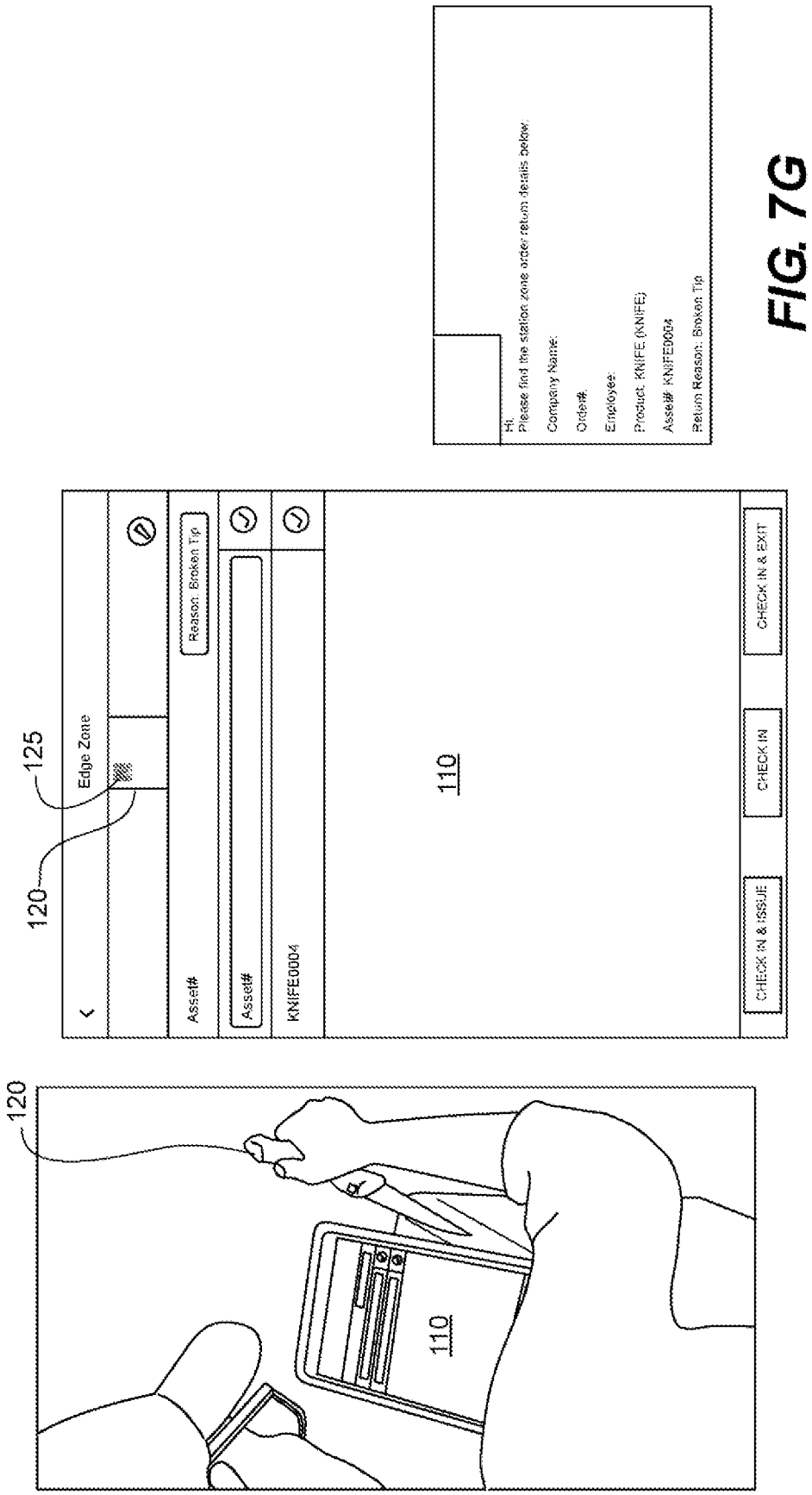

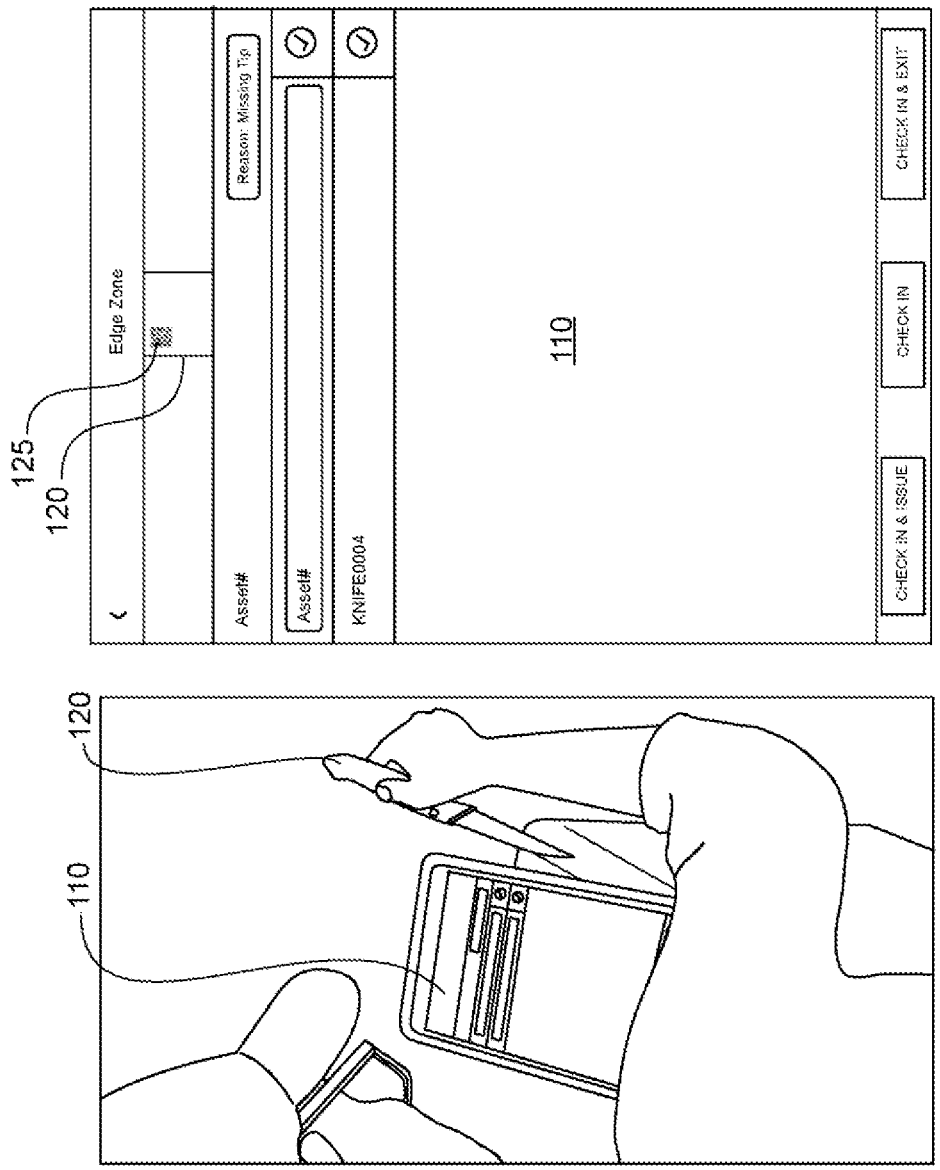
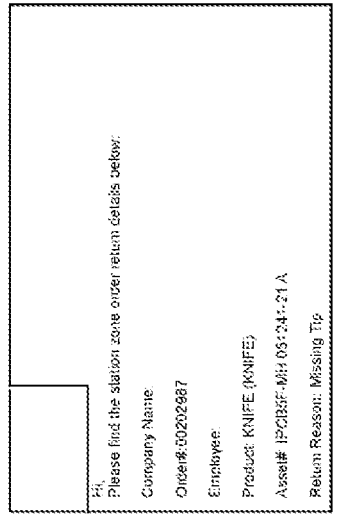
FIG. 7J
FIG. 7K
FIG. 7L

| Name (ID) | | Location |
|---|---|---|
| ABDI ALI (3173580) | 8 | CAC BF STRIP LINE 20901 |
| EH MILE (523895) | 7 | CAC BF BREAK LINE 1A 20201 |
| MICHAEL MANYUON (499878) | 7 | CAC BF TENOR PULL STATION 54500 |
| JOSHUA VALLADARES (552448) | 7 | CAC BF BREAK LINE 1A 20201 |
| NICOLAS SALAZAR (3084580) | 6 | CAC BF BREAK LINE 1A 20201 |
| NOE RAMOS (3217777) | 5 | CAC BF TENOR PULL STATION 54500 |
| SARAFINO WAR (3083745) | 5 | CAC BF BREAK LINE 1A 20201 |
| ALEX ARREOLA (3274912) | 5 | CAC BF STRIP LINE 20901 |

Showing 1 to 10 of 187 entries

Previous | 1 | 2 | 3 | 4 | 5 | ... | 19 | Next

FIG. 8D

Employee Asset Return Report

Return Reason: Broken Tip
From Date: 12/01/2021 00:00:00  00:00:00
To Date: 12/14/2021 13:00:59  23:59:59

Show 10 entries

Returned: 374  Total: 374

| Employee Name | Returned | Department # |
|---|---|---|
| MARQUIS STEWART (3247732) | 12 | CAC BF STRIP LINE 20901 |
| OSMAR CHIT MIN (4954454) | 10 | CAC BF TENOR PULL STATION 54500 |
| ABDI ALI (3173580) | 8 | CAC BF STRIP LINE 20901 |
| EH MILE (523895) | 7 | CAC BF BREAK LINE 1A 20201 |

TOOL CONTROL PROGRAM SYSTEM AND METHOD OF TOOL CONTROL

PRIORITY CLAIM

This application is a continuation of U.S. application Ser. No. 18/158,856 filed Jan. 24, 2023, which claims benefit of U.S. Provisional Application No. 63/302,438 filed Jan. 24, 2022, which is hereby incorporated by reference in its entirety.

TECHNICAL FIELD

The present invention relates generally to a system and method of a tool control program that provides real-time tracking of critical data points relating to production tools between the point of issuance to the point of return of each tool. More particularly, described herein is a tool control program system and methods of a tool control program relating to real-time tracking of each production tool assigned to a production line, production station and/or individual employee, whereby critical data points are capable of being linked to a unique asset number assigned to each production tool in real-time for management, regulatory compliance and/or employee accountability relating to each production tool.

BACKGROUND

Various industries have implemented tool control programs to provide an instant inventory of tools utilized in that particular industry, enhance safety by eliminating or minimizing mishaps, and enhancing safety related to equipment damage caused by uncontrolled tools and minimizing tool replacement costs. A problem with most tool control programs is that tools allocated to production lines, production stations or individual employees can be hard to track during a shift or production process, incidents are often recorded separately, and such electronic or written reports related thereto are not easily processed to address the specific issue.

For instance, in the food processing industry, sharp edges, such as knives, scissors and hooks, can be assigned to a production line, production station or individual employees under a tool control program. When an issue or incident arises related to that sharp edge, such as the tool being misplaced, broken or damaged, an incident report can be filled out and filed with the appropriate supervisor. However, when there are multiple production lines, production stations and/or employees with various incident reports, tracking such incidents for corrective measures can be overly time consuming and costly.

Physical contamination by a piece of a sharp edge of a production tool, such as a broken knife tip, can be the cause of a large number of food recalls each year. These recalls not only are costly to processing companies, but they can also damage company reputations and put consumer health at risk.

While the food industry takes many precautions to ensure that any food that reaches consumes is free of physical contaminants like metal, glass and stone, these contaminants can enter a product or package anytime during farming or processing. For instance, knives and scissors are routinely utilized during food processing. Over repeated use and sharpening, and simply the expected lifetime of a sharp edge tool, the tool can end up breaking, such as the knife tip. If the broken piece of the tool is not realized, found, and retrieved right away, an entire production line can be stopped resulting in lost production. Even worse, a broken piece of the production tool not realized, found and retrieved right away can result in a costly food recall. And if a tool is returned after a shift without a broken piece, it can be difficult if not impossible to identify the location and lot of potentially contaminated food, such that an even greater quantity of food may be recalled.

Other industries that utilize tools with sharp edges also have problems associated with damage to the tools. But organizing and proper communication of incident reports, much less tracking such incidents for corrective measures can be overly time consuming and costly. There are also problems in various industries of real-time tracking tools with sharp edges from the time the tool is first used until it is discarded, including intermediate use, washing or sterilization and/or any type of sharpening, grinding and the like.

Accordingly, there is a need in the industry, particularly the food processing industry, to provide a tool control program with real-time production tool tracking for production tools allocated to production lines, production stations and/or individual employees. There is also a need in the food processing industry to provide a tool control program that can improve employee accountability and asset visibility during food processing. There is further a need in the food processing industry to provide a tool control program that can provide real-time automatic alerts when an incident occurs, such as a tool being broken or lost, such as to minimize the impact of physical contamination by identifying the origination point, narrowing the search focus, limiting production down time, and minimizing overall risk and unrecoverable cost. Many if not all of these needs relating to tool control program in the food processing industry may also be applicable to other industries, such as the healthcare industry, abrasive industry, clothing and textile industry, paper and packaging industry, and the like.

SUMMARY

The present disclosure addresses the foregoing needs in the food processing industry by providing a system and method of a tool control program that provides real-time tracking of critical data points relating to production tools between the point of issuance to the point of return of each tool.

In some aspects, the tool control program system and methods of a tool control program disclosed herein relate to real-time tracking of each production tool assigned to a production line, production station and/or individual employee, whereby critical data points are capable of being linked to a unique asset number assigned to each production tool in real-time for management, regulatory compliance and/or employee accountability relating to each production tool.

In some aspects, the tool control program system and method of a tool control program have one or more production tools, each of the one or more production tools having its own assigned asset number, one or more devices capable of scanning each respective production tool to identify the asset number, the one or more devices capable of providing a designated user or location of the production tool, and a network connected to the one or more devices capable of tracking each critical data point in real-time as it relates to each respective production tool and designated user or location.

In some aspects, critical data points relate to the issuance of each production tool to the respective production line, production station and/or employee, return of each production tool from the respective production line, production station and/or employee, re-assignment of each production tool as it relates to a different production line, production station and/or employee, and/or an event related to each production tool, such as an inspection, identification of damage, breakage or missing piece of the production tool, the production tool being fixed, the production tool being reconditioned, such as sharpened, or any other event that may be desired to be tracked.

In some aspects, each production tool, such as a knife or scissors contains an asset code, whereby each asset code provides a unique asset number for that particular production tool. In some aspects, the asset number is a numerical number, alphabet number or alpha-numerical number.

In some preferable aspects, each asset code is a quick response code (QR-code) or other two-dimensional barcode. In some other aspects, the asset code is provided via an RFID tag.

In some aspects, each asset code is permanently assigned to a respective production tool, such that each production tool has its own unique asset number for the entire lifetime of the production tool and also for record keeping purposes after the production tool is removed from usage.

In some aspects, each asset code is permanently affixed to each respective production tool. In some preferred aspects, each asset code is etched, more preferably laser etched, into a portion of the production tool. In some other aspects, each asset code is a tag that is affixed to a portion of the production tool.

In some preferred aspects, the asset code is proximately located a sharp edge portion of the production tool, such as the cutting blade of a knife or scissors. In some other aspects, the asset code is proximately located a handle portion of the production tool.

Each asset code assigned to a respective production tool can be maintained in a network database, such that when the asset code is scanned by a device, real-time tracking of each production can occur on the network database.

In some preferred aspects, a method of capturing real-time data of one or more critical data points relating to a production tool associated with a designated user comprises providing at least one production tool having an asset code; providing a device capable of scanning the asset code associated with the production tool, wherein the device comprises a data management software; inputting a user code into the device, the user code associated with a designated user for issuance of the production tool; and scanning the asset code of the production tool with the device in relation to an issuance event of the production tool to the designated user; wherein the asset code of the production tool corresponds to an asset number, the user code associated with the designated user corresponds to a designated user number, and scanning the asset code with the device associates the asset number with the designated user number as an issuance critical data point in the data management software in real-time by at least date and time.

In some preferred aspects, a system configured to capture real-time data of one or more critical data points relating to each production tool associated with a respective designated user comprises one or more devices connected to a data management software via a network and comprising a camera capable of scanning a QR code or RFID tag, the data management software configured to log a user code into the data management software from the respective QR code or RFID tag associated with each designated user, the data management software configured to log into the data management software an asset code from the respective QR code or RFID tag associated with each production tool, wherein the asset code of each respective production tool corresponds to an asset number, and the user code associated with the designated user corresponds to a designated user number; wherein each asset code scanned an initial time by the one or more devices associates the asset number with the designated user number input into the data management software as an issuance critical data point in the data management software in real-time by at least date and time; wherein each asset code optionally scanned an intermediate time by the one or more devices associates the asset number with the designated user number as an event critical data point in the data management software in real-time by at least date and time; and wherein each asset code scanned a final time by the one or more devices associates the asset number with the designated user number as a return critical data point in the data management software in real-time by at least date and time.

In some aspects, critical data points are capable of being linked to each respective asset number assigned to each production tool in real-time for management, regulatory compliance and/or employee accountability relating to each production tool. In some preferable aspects, the critical data points are capable of being liked to each respective asset number assigned to each production tool and each designated user of the production tool. In some aspects, the designated user is a production line, production station and/or employee.

In some preferable aspects, the designated user, whether a production line, production station and/or employee, is also assigned a user code, whereby each user code provides a unique user number for that particular production line, production station and/or employee. In some aspects, the user number is a numerical number, alphabet number or alpha-numerical number.

In some preferable aspects, each user code is a quick response code (QR-code) or other two-dimensional barcode. In some other aspects, each user code is provided via an RFID tag. In some preferable aspects, each user code is designated to a scannable badge of each employee. In some other aspects, such as in the instances of a production line or production station, each user code is a scannable identification card for that particular production line or production station. In some aspects, the designated user may comprise a particular employee at a particular production station for a particular production line, such that there is more than one user code.

In some aspects, the asset code of a production tool is scanned at the time the production tool is assigned for each initial task. Each initial task may comprise the production tool being assigned to a specific employee, such as during the employment of that specific employee and/or the lifetime of that particular production tool. In some other instances, the initial task may be the start of a work shift, such that the production tool is checked-out to a production line, production station and/or employee.

In some aspects, the asset code of a production tool is scanned at the time the assigned production tool is returned. Each production tool may be returned upon the employment of the specific employee that the production tool was assigned ending and/or upon the lifetime of that particular production tool ending. In some other instances, the production tool may be returned upon the end of the work shift, such that the production tool is checked-in from the production line, production station and/or employee upon the completion of the work shift.

In some instances, the production tool may be assigned to a particular production line and/or production station, such that one or more employees over a period of time (various shifts or days) check-out and check-in the respective production tools. In those instances, each respective production tool may be associated with a particular employee during a work shift and then assigned to a different employee during a different shift, such that the production tool can be tracked to a specific employee during each production shift.

In some instances, the production tool may be re-assigned to a different particular production line and/or production station, such as in the situation when the production tool needs to be fixed, sharpened, inspected or otherwise removed from one production line and/or production station and assigned to a different production line and/or production station.

In some other preferable aspects, the production tool may be re-assigned to a different particular production line and/or production station while still being assigned to a particular employee, such as in the situation when the production tool needs to be fixed, sharpened, inspected or otherwise removed from one production line and/or production station and assigned to a different production line and/or production station, but still under the responsibility of that particular employee.

In some aspects, each critical data point is logged in relation to the assigned production line, production station and/or employee. By logging each critical data point, each production tool can be tracked in real-time as it relates to the respective production line, production station and/or employee, as it relates to misplaced, broken and/or damaged production tools to enhance accountability and asset visibility. The real-time tracking of each production tool also allows for automatic alerts to designated individuals, such as management, relating to lost or broken production tools, such that loss mitigation efforts may be undertaken with quicker response times. In some aspects, real-time data compilation in relation to each production tool as it relates to the respective production line, production station and/or employee also enables tool control program audit reports based upon compliance regulations, such as Brand Reputation Compliance (BRC) reporting guidelines.

In some aspects, the method of using a tool control program of the present disclosure includes providing a production tool having an asset code, providing a device capable of scanning the asset code of the production tool, scanning a user code associated with a designated user for issuance of the production tool, initiating a camera and light on the device, and scanning the asset code of the production tool with the camera of the device a first time, wherein the asset code of the production tool corresponds to an asset number, the user code associated with the designated user correspond to an user number, and scanning the user code followed by scanning the asset code associates the asset number with the user number for real-time tracking.

In some aspects, the user code is an employee QR code or RFID tag, such as that located on an employee badge, such that scanning the user code followed by scanning the asset code associates issuance of the asset number with the employee for real-time tracking.

In some aspects, the asset code is a QR code or RFID tag, such as that located on the production tool, such that scanning the user code followed by scanning the asset code associates issuance of the asset number with the designated user for real-time tracking.

In some aspects, the method further comprises scanning the asset code of the production tool with a camera of a device a second time, wherein the second scanning relates to an event relating to the production tool. In some aspects, the event relates to fixing the production tool, sharpening the production tool, identification of damage to the production tool, identification of a broken tip of the production tool, reporting a missing piece of the production tool, transferring the production tool to a different designated user, re-assigning the production tool to a different designated user, or return of the production tool by the designated user to a return location.

In some aspects, the method further comprises scanning the asset code of the production tool with a camera of a device a second time and a third time, wherein the second scanning relates to an event relating to the production tool other than return of the production tool by the designated user to a return location, and the third scanning relates to the designated user returning of the production tool to a return location. In some aspects, the event of the second scanning relates to fixing the production tool, sharpening the production tool, identification of damage to the production tool, identification of a broken tip of the production tool, reporting a missing piece of the production tool, reporting the production tool as being lost or misplaced, transferring the production tool to a different designated user, or re-assigning the production tool to a different designated user.

In some aspects, the method further comprising providing a real-time notification in relation to one or more of the critical data points. In some aspects, the real-time notification relates to the critical data point chosen from identification of damage to the production tool, identification of a broken tip of the production tool, reporting a missing piece of the production tool, or reporting the production tool as being lost or misplaced. In some aspects, the real-time notification is provided to one or more designated recipients, such as a supervisor, manager, or the like. In some aspects, the real-time notification is an email, text message, automated phone call, smart-device pop-up notification, or the like.

In some aspects, the method further comprises logging each critical data point in relation to the designated user.

In some aspects, the method further comprises running a real-time data analytics report, wherein the real-time data analytics report provides each critical data point in relation to the designated user for one or more production tools. In some aspects, the real-time data analytics report for each critical data point provides the date and time related to the critical data point and a description of each critical data point.

In some aspects, the real-time data analytics report is an electronic report providing an asset return report, wherein the asset return report provides the logged information on the date and time that each production tool was returned by the designated user to a different designated user or a return location. In some aspects, the real-time data analytics report is an electronic report providing a reason for return for each production tool, wherein the reason for return may be damage to the production tool, broken tip of the production tool, missing piece of the production tool and/or return of the production tool to a return location.

In some aspects, the production tool is a knife, scissors or hook and the real-time data analytics report is an electronic report providing each critical data point relating to the production tool being sharpened.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 5A is a picture of a user having a production tool interacting with the user interface of the device having two selectable icons, which are shown as an "Edge Zone" selectable icon and a "Sharpening Zone" selectable icon, wherein the two selectable icons allowing the user to choose between two different zones pertaining to the production tool, wherein a first selectable icon pertaining to checking-in, checking-out and tracking physical damage associated with a respective production tool, and wherein a second selectable icon pertaining to tracking events associated with a respective production tool, such as a sharpening event, according to certain embodiments of the present invention.

FIG. 5B is a corresponding image of the user interface of the device in FIG. 5A, wherein the user interface is shown prior to the user selecting either of the selectable icons, according to certain embodiments of the present invention.

FIG. 7E is a picture of a user with a production tool scanning the asset code of the respective production tool issued to a designated user having the "Broken Tip" after selecting the physical damage pull-down option of a broken tip, wherein one or more production tools are capable of being scanned to have the physical damage of a broken tip recorded, according to certain embodiments of the present invention.

FIG. 7F is a corresponding image of the user interface of the device in FIG. 7E, wherein the user interface of the device prior to the asset code of the production tool being scanned, which illustrates that an asset code in the top camera scanning view about to be scanned and the lower interface showing the asset code has not yet been scanned, according to certain embodiments of the present invention.

FIG. 7G is a an image showing a message automatically generated by the system after the production tool is scanned in relation to a broken tip event, wherein the automatically generated message generates desired information, such as the company name, order number, employee to which the production tool is checked-out, type of production tool, asset number associated with the production tool, and the reason the production tool is being returned (e.g., broken tip event), according to certain embodiments of the present invention.

FIG. 7J is a picture of a user with a production tool scanning the asset code of the respective production tool issued to a designated user having the "Missing Tip" after selecting the physical damage pull-down option of a broken tip, wherein one or more production tools are capable of being scanned to have the physical damage of a missing recorded, according to certain embodiments of the present invention.

FIG. 7K is a corresponding image of the user interface of the device in FIG. 7J, wherein the user interface of the device prior to the asset code of the production tool being scanned, which illustrates that an asset code in the top camera scanning view about to be scanned and the lower interface showing the asset code has not yet been scanned, according to certain embodiments of the present invention.

FIG. 7L is a an image showing a message automatically generated by the system after the production tool is scanned in relation to a missing tip event, wherein the automatically generated message generates desired information, such as the company name, order number, employee to which the production tool is checked-out, type of production tool, asset number associated with the production tool, and the reason the production tool is being returned (e.g., missing tip event), according to certain embodiments of the present invention.

FIG. 8A is a schematic of real time data analytics that are available relating to the return of production tools by designated users, whereby the compiled critical data points of production tools returned by specific employees can be filtered based upon a desired scope of time, return reason and/or designated user (e.g., employee), according to certain embodiments of the present invention.

FIG. 8B is a schematic of real time data analytics that are available relating to the return of production tools by designated users of FIG. 8A, whereby the compiled critical data points of production tools returned by specific employees can be filtered based upon a desired return reason, such as physical damage (e.g., "Broken Tip", "Missing Tip", etc.), which can be pulled from a drop-down menu of preset return reasons, according to certain embodiments of the present invention.

FIG. 8C is a schematic of real time data analytics showing the total number of critical data points relating to a specific return reason, which illustrates the total incidents of the specified return reason for the specified date range provided in FIG. 8B, according to certain embodiments of the present invention.

FIG. 8D is another schematic of real time data analytics showing the hit results of the critical data points relating to a specific return reason, which illustrates the total incidents of the specified return reason for the specified date range provide in FIG. 8B, according to certain embodiments of the present invention.

FIG. 8E is another schematic of real time data analytics showing the hit results of the critical data points relating to a specific return reason, which illustrates the total incidents of the specified return reason for the specified date range can be analyzed on a designated user (e.g., employee) by designated user basis, according to certain embodiments of the present invention.

FIG. 8F is another schematic of real time data analytics showing the hit results of the critical data points relating to a specific return reason of the respective production tools for a particular designated user (employee), which illustrates the designated user number (employee's user number), the asset number, the logged date and time of the critical data point, and the return reason logged in real-time, according to certain embodiments of the present invention.

Figure 1:
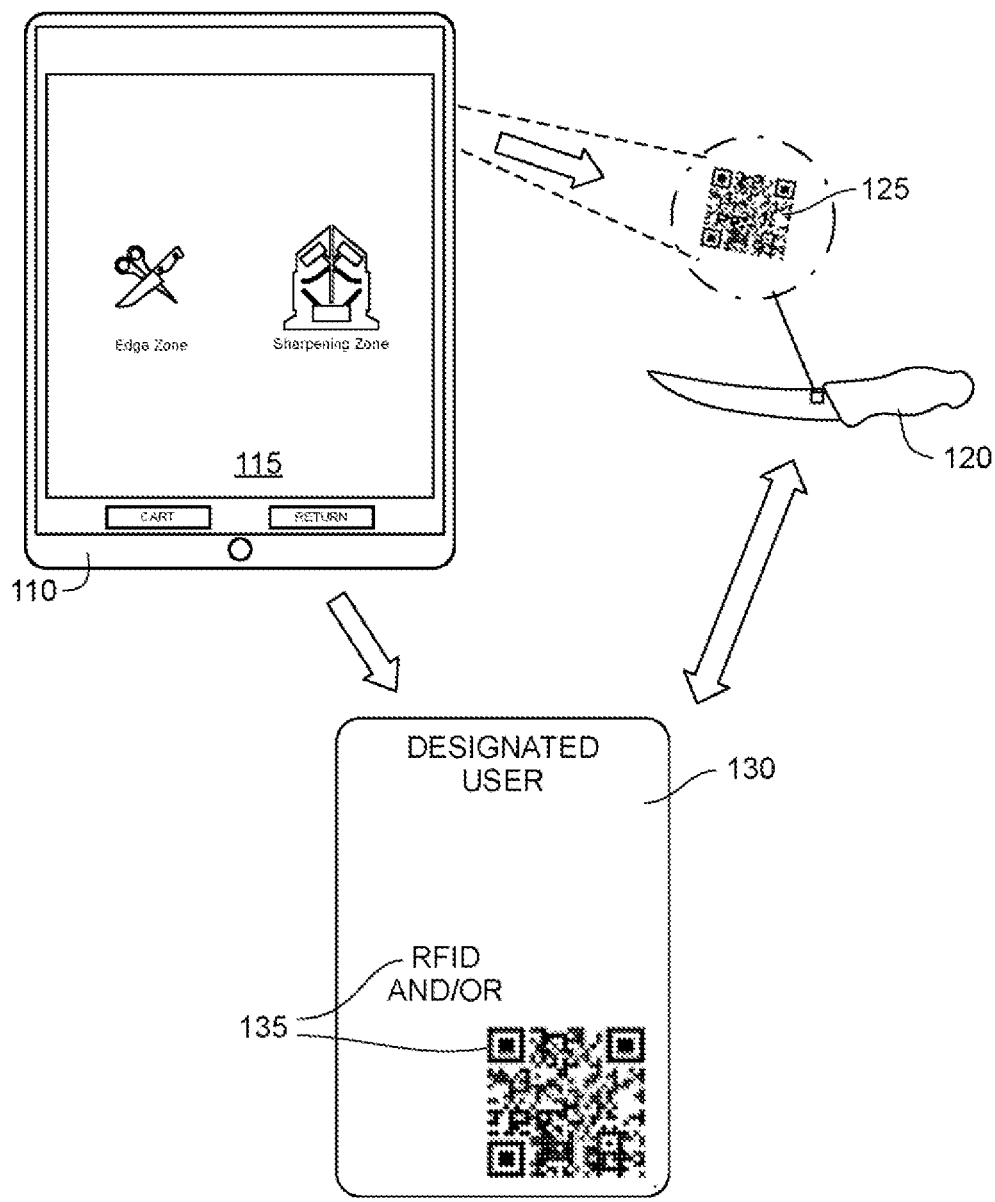
FIG. 1 is a schematic of various components of a system and method of a tool control program that is capable of providing real-time tracking of one or more critical data points relating to at least one production tool from a point of issuance of the at least one production tool to a designated user until a of return of the at least one production tool, according to certain embodiments of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure provides the invention of a system and method of a tool control program that provides real-time tracking of critical data points relating to production tools between the point of issuance to the point of return of each tool, such that real time data analytics can be provided for regulatory compliance, employee training, improving employee accountability and real-time asset visibility during food processing.

Referring now generally to FIG. 1, a schematic of three components of the present system and method are illustrated, one or more devices 110 having software capable of real-time logging and tracking of critical data points, a production tool 120 having at least one asset code 125 that is capable of being scanned by the one or more devices 110, and a designated user 130 having an RFID tag or user code 135.

Figure 4B:
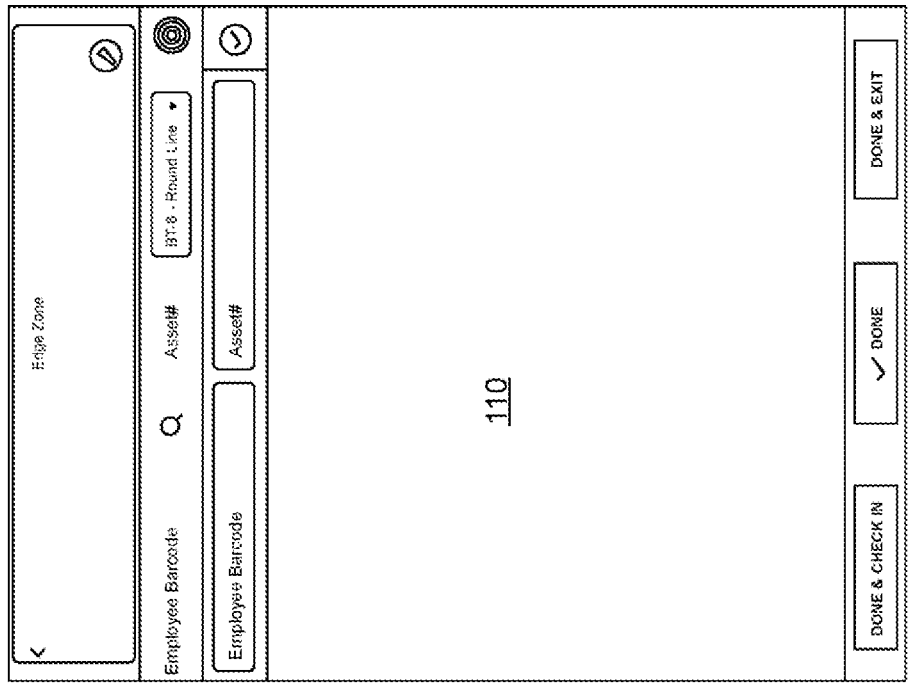
FIG. 4B is a corresponding image of a user interface of the device in FIG. 4A, wherein the user interface shown in a check-out mode prior to the employee badge being scanned for a corresponding user code or any asset code of a production tool being scanned, such that the user interface does not yet have a user code or an asset code, according to certain embodiments of the present invention.
Figure 4A:
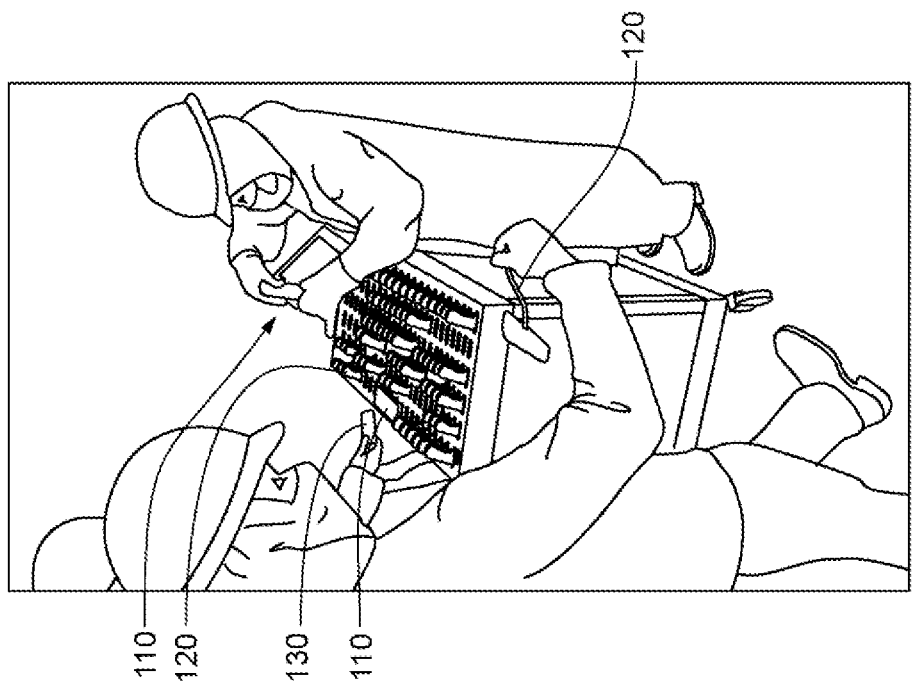
FIG. 4A is a picture of a designated user prior to scanning an employee badge with a first scanner of a device capable of scanning the employee badge to check-out one or more production tools from an issuance location, with the first scanner, a second scanner in communication with the device, or the device itself capable of scanning an asset code of one or more production tools, wherein the first and second scanners coupled with the device or otherwise in communication with the device, according to certain embodiments of the present invention.
Figure 4D:
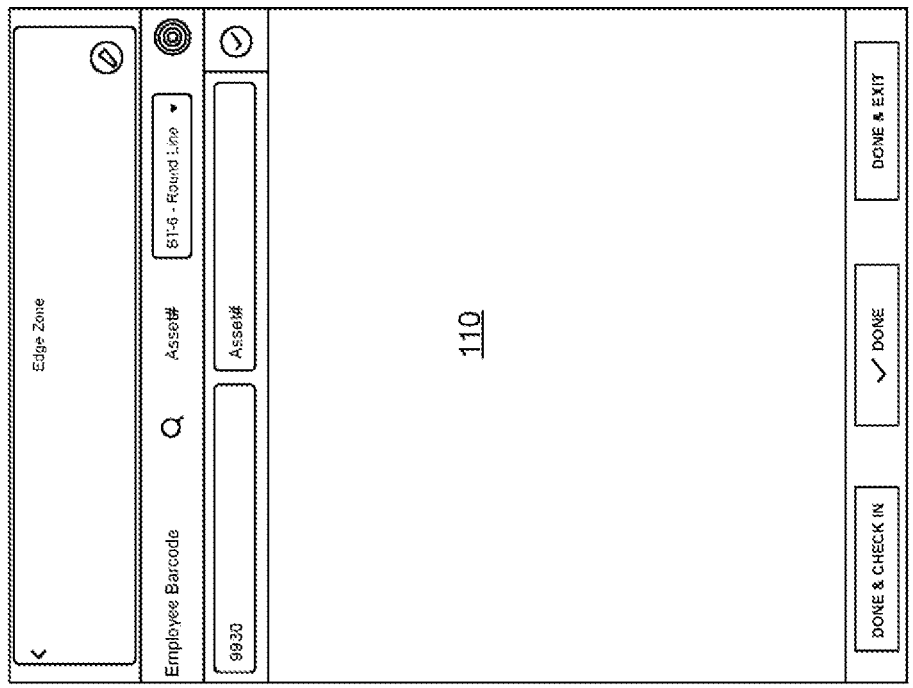
FIG. 4D is a corresponding image of the user interface of the device in FIG. 4C, wherein the user interface of the device registering a user number associated with the scanned user code of the employee badge in real-time, an asset code has not yet been scanned such that an asset number has not yet been associated with the user number, according to certain embodiments of the present invention.
Figure 4C:
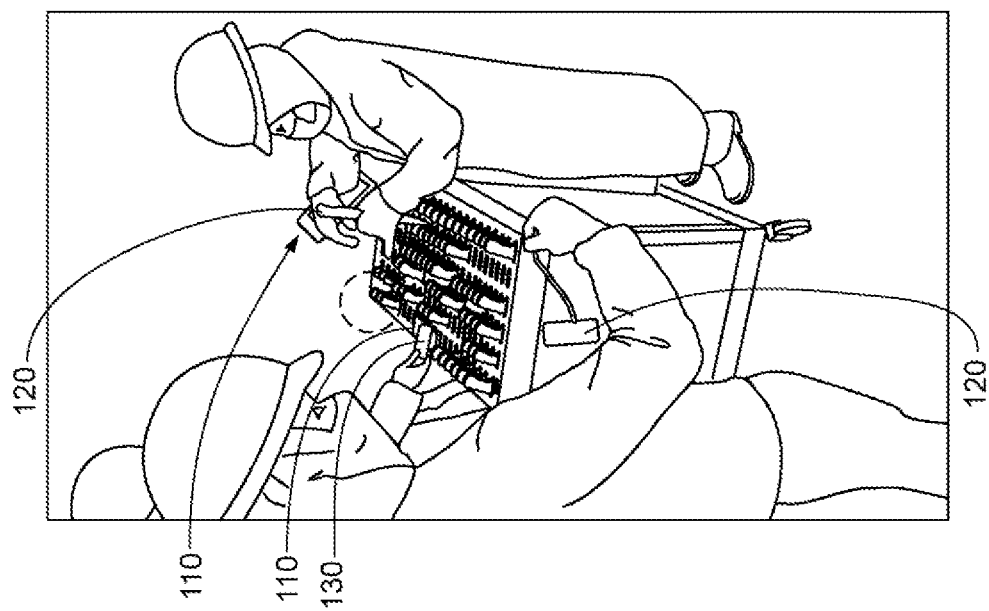
FIG. 4C is a picture of the designated user of FIG. 4A having its employee badge scanned by the first scanner associated with the device, such that scanning the employee badge with the first scanner logs a corresponding user code in the associated software enabling the designated user to check-out one or more production tools from an issuance location and either the first or the second scanning device capable of scanning an asset code of one or more production tools, according to certain embodiments of the present invention.

The one or more device 110 can be connected to a network, such that one device 110 located in a first location of a facility may conduct a first activity while another device 110 located in a second location of the facility may conduct a second activity, whereby the first and second activities are logged into the system. In some preferred aspects, device 110 may comprise a remote scanner, such as shown in FIG. 4A, for reading the user code 135, whereby the remote scanner is operably connected and in communication with device 110. In some other preferred aspects, device 110 is in communication with a remote scanner and also has an integral scanner, such as a camera that is capable of reading a quick response code (QR-code), RFID tag, or other scannable code associated with the designated user 130, one or more production tools 120, or a combination thereof.

Production tool 120 can comprise various tools issued to a designated user to perform one or more tasks. For instance, in the food industry, production tool 120 can be a hand tool or implement used within a manual or automated process to produce useful work, such a knife, scissors, scalpel, spreading device, prying device, chipping device, cutting device, or stripping device. In some preferred aspects, production tool 120 can have a sharp edge implement, such as a knife, scissors, hooks, shears and scalpel. In some other preferred aspects, production tool 120 can be personal protection equipment, such as mesh equipment to protect the user from being cut or punctured by a sharp edge implement, including at least stainless steel mesh gloves, mesh apron, mesh tunic and mesh leggings.

In the healthcare industry, production tool 120 can be a medical, surgical or dental hand tool or implement used within a manual or automated process to produce useful work, such a knife, scissors, scalpel, scalers, scrapers, mirrors, sickle probe, drills, molds, forceps, clamps, bone cutters, spreading device, prying device, retractors, chipping device, cutting device, stripping device, or the like.

Figure 2A:
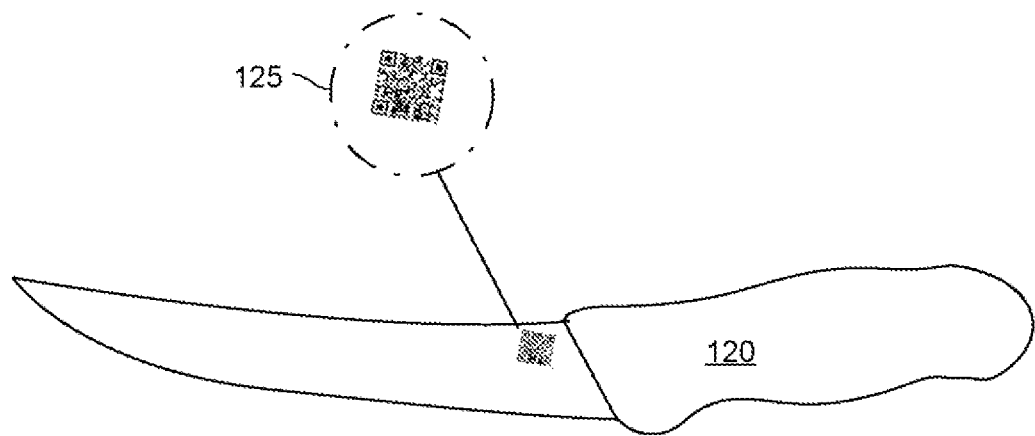
FIGS. 2A and 2B are images of two production tools, specifically two knives, each production tool having a scannable asset code corresponding to a unique asset number for each production tool, which are blown-up in the respective circles for illustrative purposes, according to certain embodiments of the present invention.
Figure 2B:
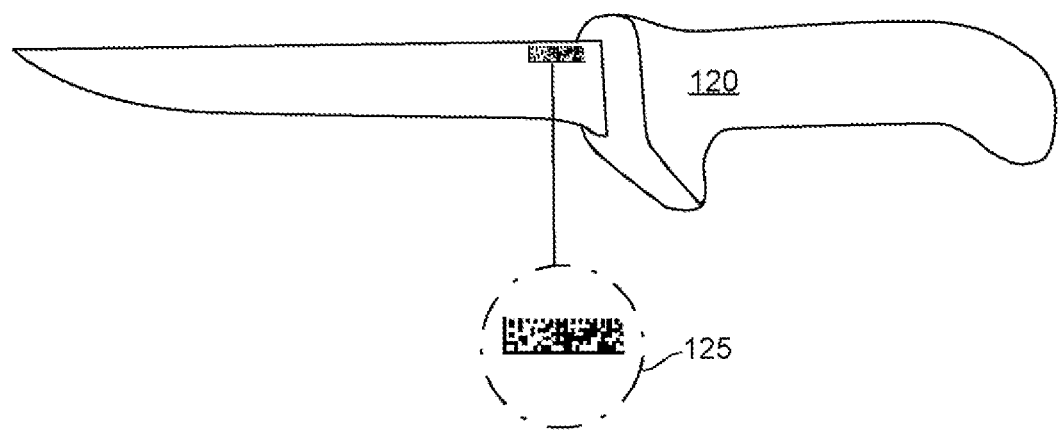

Asset code 125 of each production tool 120 corresponds with a unique asset number that is assigned to each production tool 120. In some aspects, each asset number is a numerical number, alphabet number or alpha-numerical number. Each asset code 125 is preferably a quick response code (QR-code) or other two-dimensional barcode. In some other aspects, the asset code 125 is provided via an RFID tag. Each asset code 125 is preferably permanently assigned to a respective production tool 120, such that each production tool 120 has its own unique asset number for the entire lifetime of the respective production tool 120 and also for record keeping purposes after the production tool 120 is removed from usage. Each asset code 125 is also preferably permanently affixed to each respective production tool 120. In some preferred aspects, each asset code 125 is etched, more preferably laser etched, into a portion of the production tool 120, such as shown in FIG. 2. In some other aspects, each asset code 125 is a tag that is affixed to a portion of the production tool.

Asset code 125 is preferably proximately located a sharp edge portion of the production tool 120, such as the cutting blade of a knife or scissors, as illustrated in FIG. 2. In some other aspects, asset code 125 is proximately located a handle portion of the production tool 120. In some aspects in relation to production tool 120 that comprises a mesh equipment, asset code 125 comprises a stainless steel tag affixed to the respective mesh equipment.

The designated user 130 can be a production line, production station and/or employee. For instance, the designated user 130 may relate to a particular production line, whereby the production tool 120 is capable of being utilized by each member of that production line. In some other aspects, the designated user 130 may relate to a particular production station, whereby the production tool 120 is capable of being utilized by each member of that production station. In some preferred aspects, the designated user 130 is a specific employee, such that the production tool 120 is directly related to that specific employee. In some instances, it may be appropriate for the designated user 130 to be a production line, while in other instances it may be a production station within a particular production station, while yet in other instances it may be a specific employee of a production line, production station, or production station of a particular production line. While the designated user 130 being a specific employee may allow real-time data logging on an employee-by-employee basis, which may be appropriate in some situations, there may be other situations where that level of granularity is unnecessary or unwarranted.

User code 135 of each designated user 130 corresponds with a unique user number, such that the desired level of granularity can be easily achieved. For instance, in the situation of the designated user being an employee, user code 135 can correspond with a unique employee number. In some preferable aspects, each unique user number for that particular production line, production station and/or employee, is preferably a numerical number, alphabet number or alpha-numerical number.

In some preferable aspects, each user code 135 is a quick response code (QR-code) or other two-dimensional barcode. In some other aspects, each user code 135 is provided via an RFID tag. In some preferable aspects, each user code 135 is designated to a scannable badge of each employee. In some other aspects, such as in the instances of a production line or production station, each user code 135 is a scannable identification card for that particular production line or production station. In some aspects, designated user 130 may comprise a particular employee at a particular production station for a particular production line, such that there is more than one user code 135.

During normal use, the system software is capable of real-time tracking of various critical data points in relation to the asset number associated with each production tool 120 in relation to the designated user number. For instance, in food processing, real-time data capture can be provided for edge production tools, such as knives, scissors and/or hooks. This enables real-time tracking of not only when the production tool 120 is issued to the designated user 130 or returned from the designated user 130, but also any critical data points between those points in time, such as sharpening of blades, broken tips, missing tips, damage, etc. The same type of crucial data points can also be tracked in real-time in other industries, such as the healthcare industry.

In the instance of broken tips or missing tips, real-time data capture enables quicker response time to physical contamination, easier identification of the origination point, narrowing any search focus, which enables limiting production down time and minimizing overall risk. The real-time data capture also allows for data to be compiled in tool control program audit reports based upon any required regulatory or reporting guidelines, such as BRC reporting guideline 4.9.2 relating to sharp metal implements for food processing.

Referring now to FIGS. 4A-4H, user code 135 of a designated user 130 is input into device 110, such as by scanning an employee badge having a QR-code or RFID tag. Once user code 135 is input into the software associated with device 110, the software interface can automatically populate the user number associated with user code 135, such as shown between FIGS. 4B-4D. Alternatively, the software interface can provide for the option of two or more applications to be chosen. For instance, as it relates to sharp edge production tools, the software interface can provide a first application option relating to checking-in and checking-out one or more production tools 120 or a second application option relating to other critical data points, such as sharpening or physical damage assessment and reporting relating to production tool 120.

Figure 3:
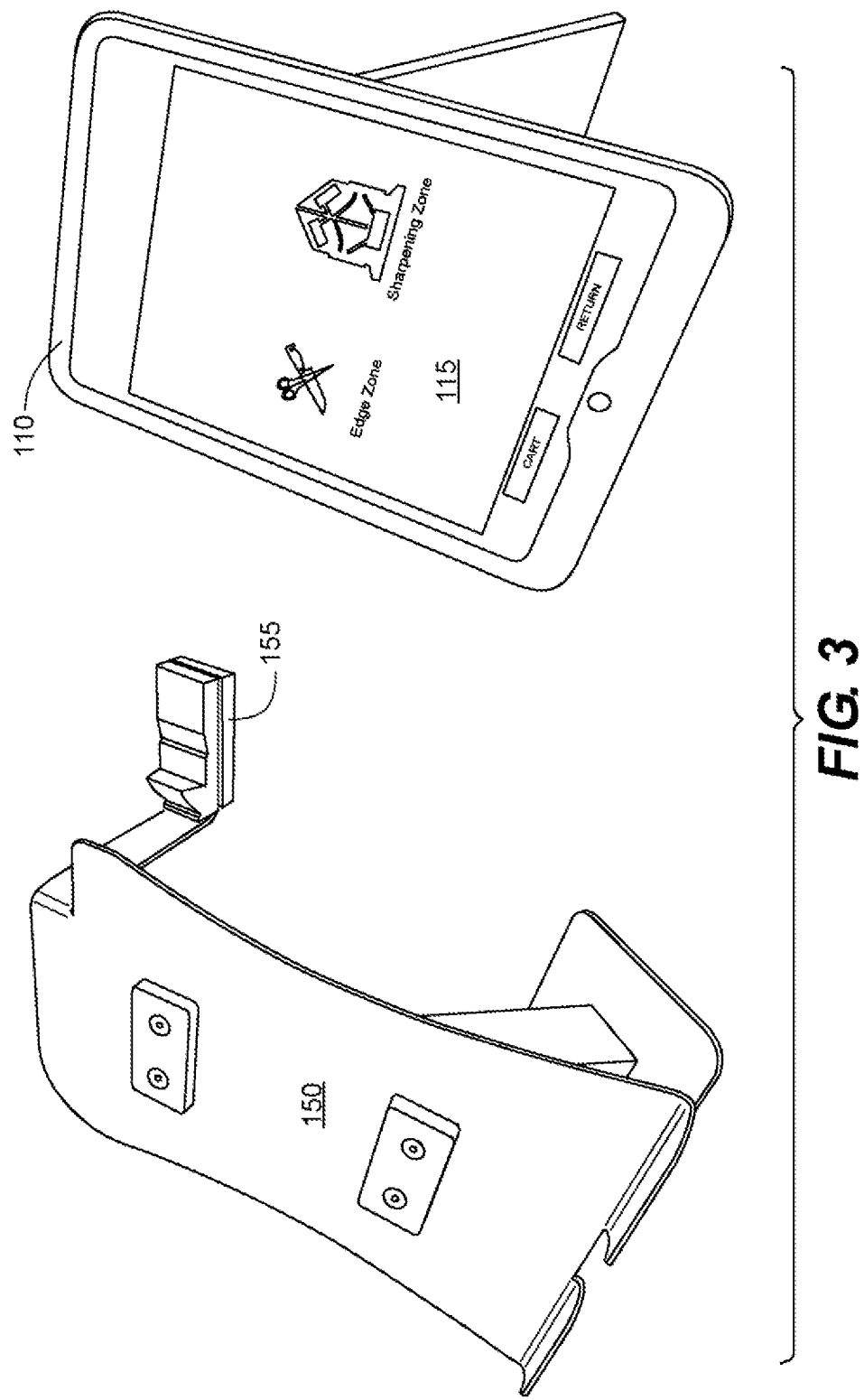
FIG. 3 is a device capable of scanning an asset code of each production tool, the device containing a software providing a user interface for selecting a desired critical data point relating to the production tool, the user interface optionally having two or more selectable icons, each selectable icon relating to different critical data points in real-time pertaining to the production tool, and an optional stand capable of supporting the device and guiding a user to scan the asset code of the production tool during the normal course of operation, according to certain embodiments of the present invention.

As it relates to either application, in some preferred aspects the software can automatically initiate the camera and light of the device 110, enabling quick scanning of any asset code 125. In an alternative embodiment, the camera and light are initiated upon a specific application being initiated on the user interface 115 of device 110. For example, in an embodiment where there are at least two selectable icons on user interface 115, the user selecting one of the selectable icons automatically initiates the camera and light of the device 110. For example, in a preferred embodiment as shown in FIGS. 3 and 5B, user interface 115 of device 110 has an "Edge Zone" selectable icon and a "Sharpening Zone" selected icon, wherein the user tapping either selectable icon automatically initiates the camera and light of the device 110. In some aspects, the camera and light stay on until the user completes the task and confirms completion of the task on the user interface of device 110, such as pressing a completed task button (e.g., Done, Task Complete, etc.) and exits out of that particular application on device 110.

Figures 4E, 4F:
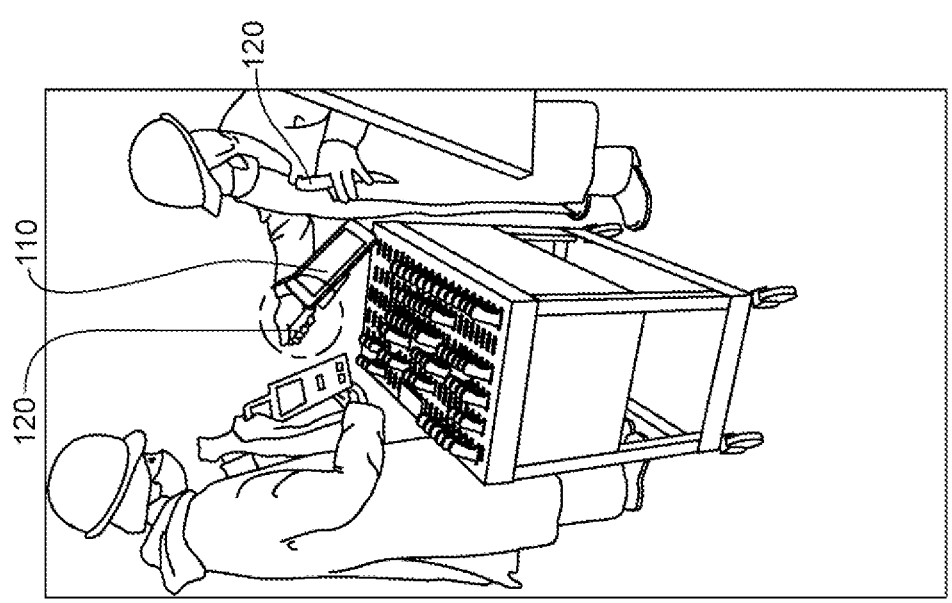
FIG. 4E is a picture of the designated user of FIG. 4A having scanned its employee badge to check-out one or more production tools from an issuance location and an issuer of the production tools scanning an asset code of a first production tool with the device for issuance, according to certain embodiments of the present invention.
FIG. 4F is a corresponding image of the user interface of the device in FIG. 4E, wherein a camera scanner view of the device shown in the top portion of the device scanning the asset code of a first production tool, and the user interface registering the user number associated with the scanned user code and an asset number associated with the scanned asset code of the first production tool, whereby the user number and asset number are now logged as a critical data point in real-time, such that issuance of the respective production tool to the specific user number is date and time logged by the software system, according to certain embodiments of the present invention.
Figures 4G, 4H:
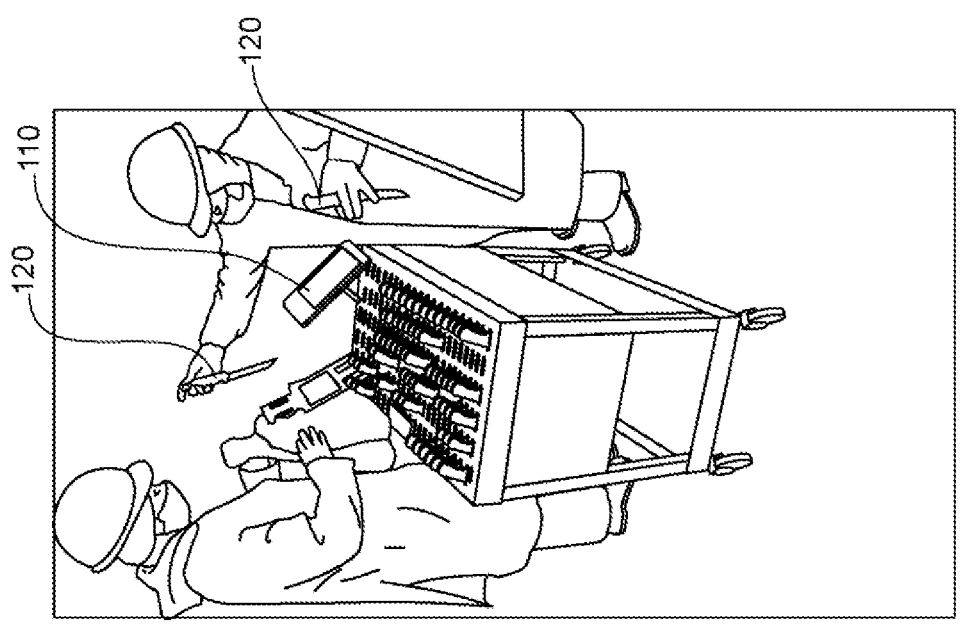
FIG. 4G is a picture of the designated user of FIG. 4A having scanned its employee badge to check-out one or more production tools from an issuance location, and an issuer of the production tools scanning an asset code of a second production tool with the device for issuance, according to certain embodiments of the present invention.
FIG. 4H is a corresponding image of the user interface of the device in FIG. 4G, wherein the user interface having a camera scanner view of the device shown in the top portion of the device scanning the asset code of a second production tool, and the user interface registering the user number associated with the scanned user code and an asset number associated with the first and second scanned asset codes, whereby the user number and the first asset number and the user number and the second asset numbers are each logged as separate critical data points in real-time, such that issuance of each respective production tool to the specific user number is date and time logged by the software system, according to certain embodiments of the present invention.

Once user code 135 is input and any software interface is selected, if needed, an asset code 125 of one or more production tools 120 can then be scanned by device 110. Upon scanning each asset code 125 of each production tool 120, user interface 115 of the device 110 having the software registers the asset number associated with the scanned asset code 125 in relation to the user number in real-time, such that the date and time of the production tool 120 being checked-out or issued is logged by the software, such as illustrated in FIGS. 4E-4H. Any number of production tools 120 can be checked-out to a designated user 130. For instance, as shown in FIGS. 4E-4F, a single production tool 120 is checked-out to a designated user 130, and two production tools 120 are checked-out to designated user 130 in FIGS. 4G-4H.

Upon return of one or more production tools 120, the same sequence of events can be followed. User code 135 of a designated user 130 is input into device 110, such as by scanning an employee badge having a QR-code or RFID tag. Once the user code 135 is input into device 110, the software interface can automatically populate the user number associated with the user code 135. The software of selection of a particular application on the user interface of device 110 automatically initiates the camera and light of the device 110. The software interface may also indicate the production tools 120 checked-out to that designated user 130.

Once the user code 135 is input and any software interface is selected, if needed, an asset code of one or more production tools 120 can then be scanned by device 120 for return or check-in. Upon scanning each asset code 125 of each production tool 120 being returned, the user interface of the device 110 having the software registers the asset number associated with the scanned asset code 125 in relation to the user number in real-time, such that the date and time of the production tool 120 being checked-in or returned is logged by the software. In some aspects, the camera and light stay on until the user completes the check-in/return task and confirms completion of the task on the user interface of device 110, such as pressing a completed task button (e.g., Done, Task Complete, etc.) and exits out of that particular application.

In some alternative aspects, user code 135 is not input prior to return of production tool 120, such that scanning each asset code 125 of each production tool 120 being returned registers the asset number associated with the scanned asset code 125 in relation to the user number that previously checked out the production tool 120 in real-time, such that the date and time of the production tool 120 being checked-in or returned is logged by the software to the user on file without necessarily having to scan user code 135.

Figure 9:
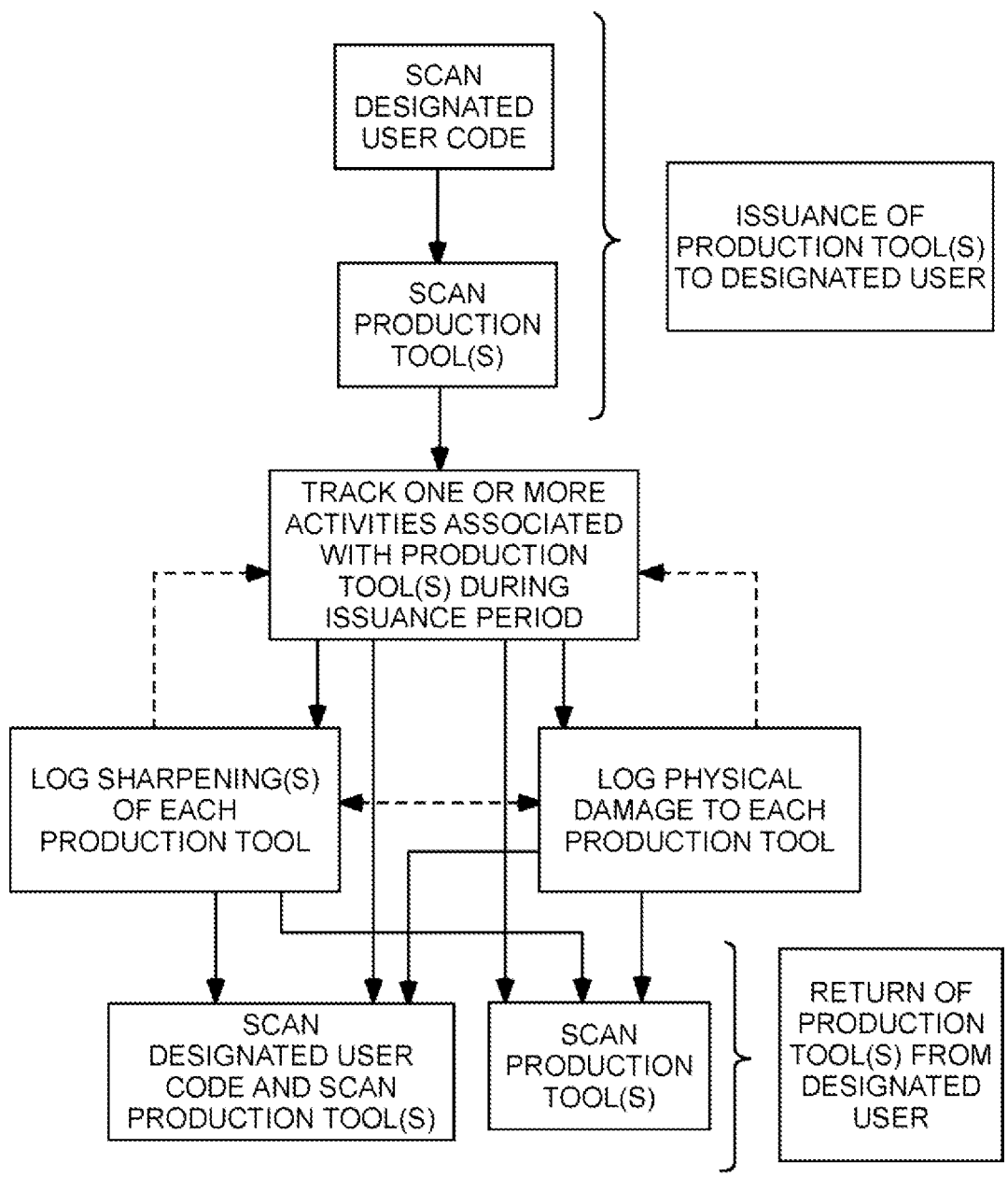
FIG. 9 is a flow-chart relating to tracking activities as critical data points associated with each production tool issued to a designated user between the time of issuance of the production tool to the designated user and return of the respective production tool from the designated user, wherein the tracked activities between the issuance critical data point and return critical data point can include one or more sharpening of each respective production tool and/or one or more types of physical damage incurred to each respective production tool, according to certain embodiments of the present invention.

Besides the critical data points relating to production tools 120 being checked-out or checked-in by the designated user 130, critical data points logged by the software can relate to events between issuance of production tool(s) 120 to designated user and return of production tool(s) 120 from designated user, such as shown in the flow diagram of FIG. 9. For instance, critical data points can relate to re-assignment of a production tool 120 to a different production line, production station and/or employee, inspection, identification of physical damage, breakage or a missing piece of production tool 120, production tool 120 being fixed, production tool 120 being reconditioned, production tool 120 being sharpened and/or any other event that may be desired to be tracked in relation to production tool 120.

In some aspects, production tool 120 is subjected to at least one sharpening activity between the time of issuance and the time of return. In some aspects, production tool 120 is subjected to at least one physical damage inspection between the time of issuance and the time of return. In some aspects, production tool 120 is subjected to at least one sharpening activity and at least one physical damage inspection between the time of issuance and the time of return.

In tracking critical data points, a device 110, whether the same device used for check-out or check-in or different device 110, may be initiated. Initiation may again occur by input of the designated user code 135. Alternatively, user interface 115 of device 110 may be initiated, such that the camera and light are automatically initiated and the asset code 125 of production tool 120 can be scanned. Upon being scanned, the real-time data may indicate the designated user 130 that has the production tool 120 checked-out. A user may utilize the software interface on device 110 to manage any event to be properly tracked as a critical data point.

Figure 6B:
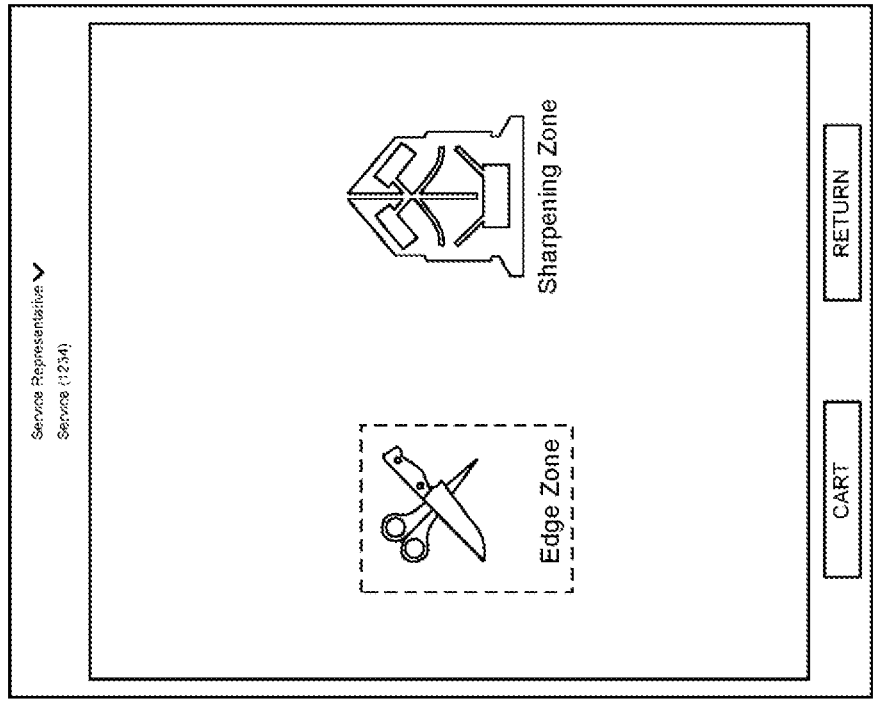
FIG. 6B is a corresponding image of the user interface of the device in FIG. 6A, wherein the user interface of the device showing the user having selected the selectable icon associated with tracking an event associated with a respective production tool, which corresponds to the "Sharpening Zone" selection icon pertaining to a sharpening event, according to certain embodiments of the present invention.
Figure 6A:
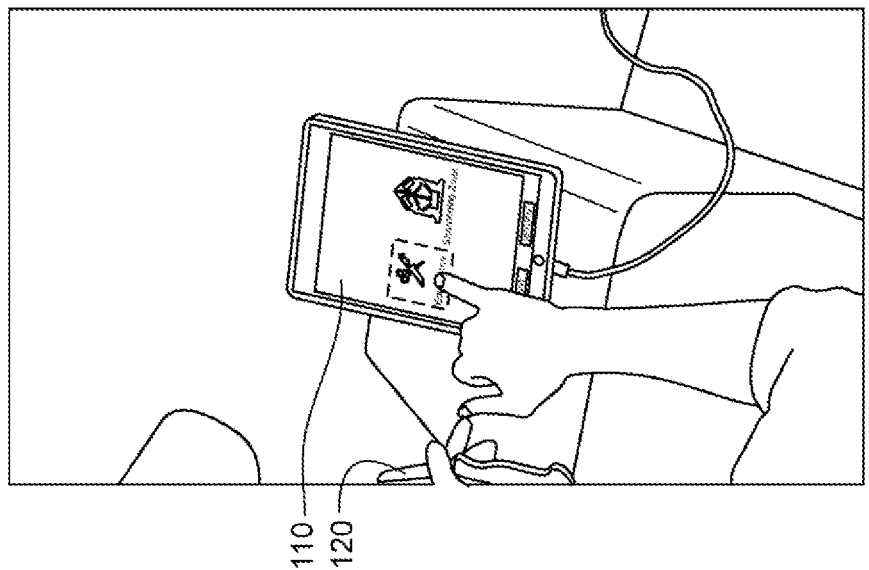
FIG. 6A is a picture of a user having a production tool interacting with the user interface of the device after selecting the selectable icon associated with tracking an event associated with a respective production tool, which is shown as a sharpening event, according to certain embodiments of the present invention.
Figure 6D:
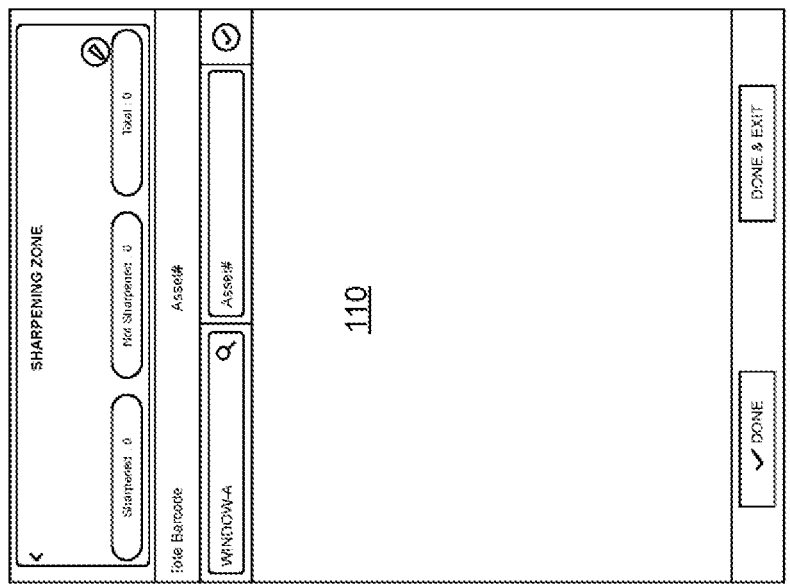
FIG. 6D is a corresponding image of the user interface of the device in FIG. 6C, wherein the user interface of the device prior to the asset code of the production tool being scanned, which illustrates that an asset code in the top camera scanning view about to be scanned and the lower interface showing the asset code has not yet been scanned, according to certain embodiments of the present invention.
Figure 6C:
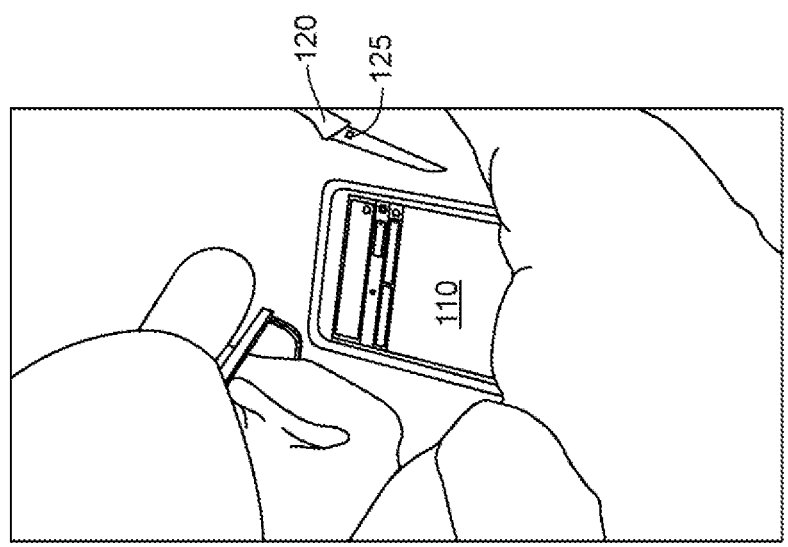
FIG. 6C is a picture of a user interface after the user selecting the selectable icon associated with tracking a sharpening event of the respective production tool, the user interface shown with the user about to scan the asset code of the respective production tool issued to a designated user, according to certain embodiments of the present invention.
Figure 6F:
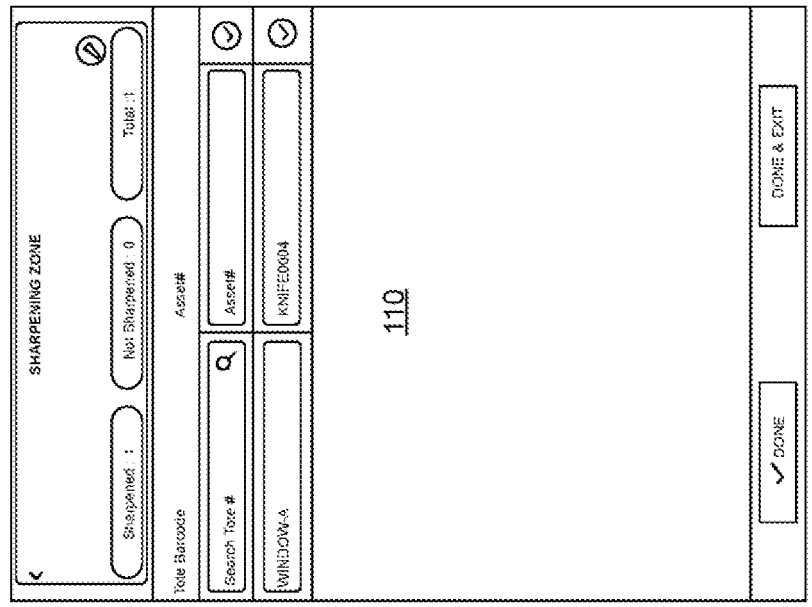
FIG. 6F is a corresponding image of the user interface of the device in FIG. 6E, wherein the user interface of the device registering the asset code of the production tool being scanned, which illustrates that the asset code for the sharpening event has been logged by the software as a critical data point in real-time, such that the sharpening event associated with the respective production tool to the specific user number is date and time logged by the software system, according to certain embodiments of the present invention.
Figure 6E:
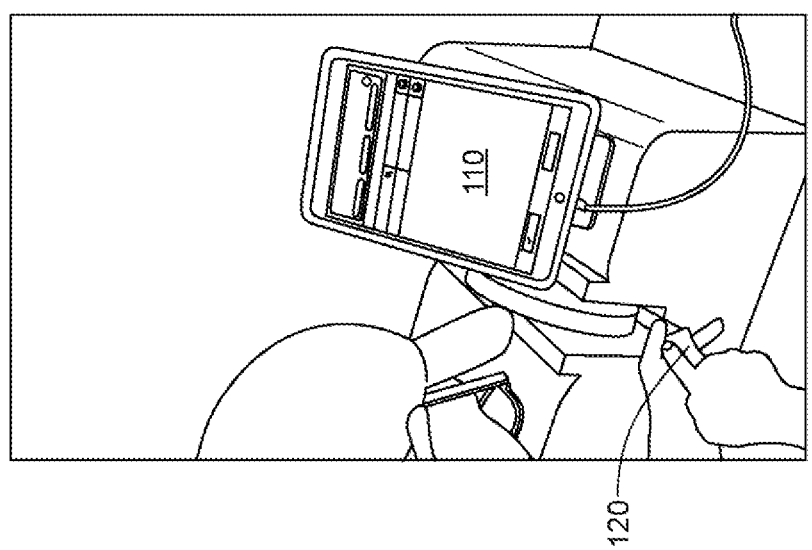
FIG. 6E is a picture of a user having scanned the asset code of a production tool issued to a designated user, with the service representative conducting a sharpening event of the production tool, according to certain embodiments of the present invention.
Figures 6G, 6H:
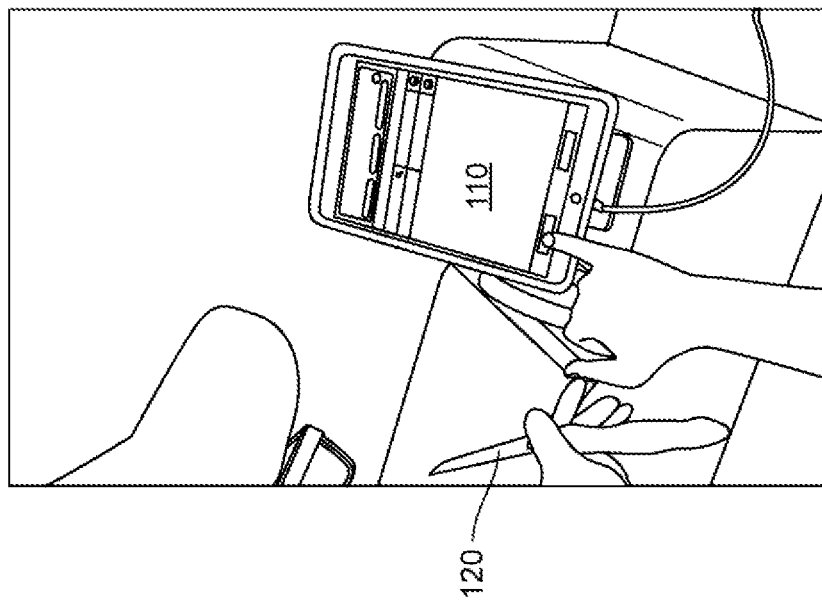
FIG. 6G is a picture of the user having completed the sharpening event of the production tool identified by the asset number, and the user completing the sharpening event by clicking the "Done" icon on the user interface, according to certain embodiments of the present invention.
FIG. 6H is a corresponding image of the user interface of the device in FIG. 6G with the "Done" icon having been clicked by the user, wherein the user interface allowing the user to confirm completion of the sharpening event, such that the sharpening event is logged by the software as a critical data point in relation to the designated user in real-time, according to certain embodiments of the present invention.
Figure 7B:
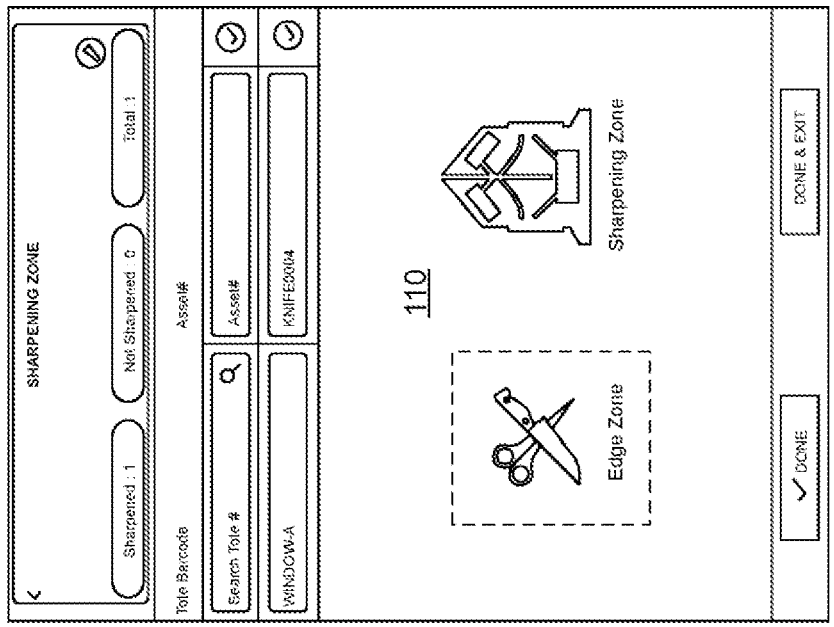
FIG. 7B is a corresponding image of the user interface of the device in FIG. 7A, wherein the user interface of the device showing the user having selected the selectable icon associated with tracking physical damage associated with a respective production tool, which corresponds to the "Edge Zone" selection icon, according to certain embodiments of the present invention.
Figure 7A:
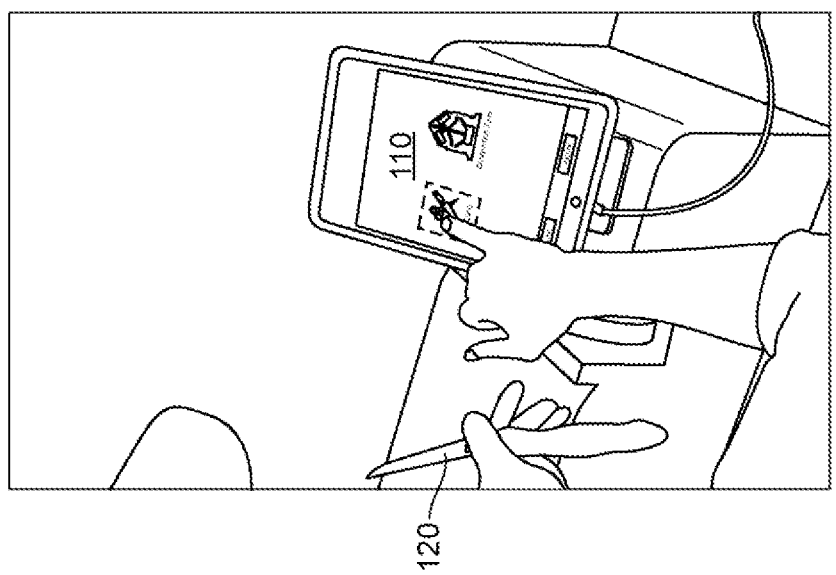
FIG. 7A is a picture of a user having a production tool interacting with the user interface of the device after selecting the selectable icon associated with tracking an event associated with a respective production tool, which is shown as an edge zone event, according to certain embodiments of the present invention.
Figures 7C, 7D:
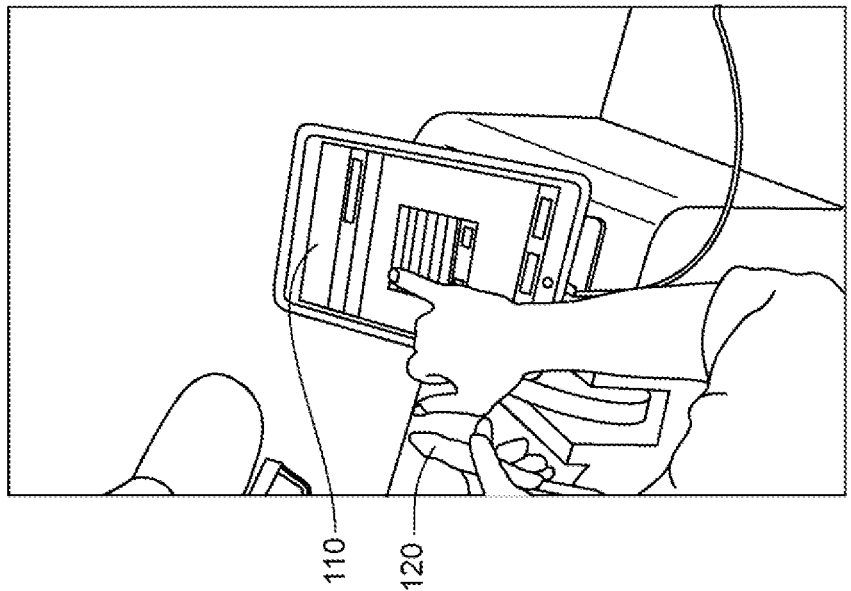
FIG. 7C is a picture of a user with a production tool interacting with the user interface pull-down options after selecting the selectable icon associated with tracking physical damage associated with a respective production tool, wherein the pull-down option allows the user to choose between different types of physical damage to the production tool, according to certain embodiments of the present invention.
FIG. 7D is a corresponding image of the user interface of the device in FIG. 7C, wherein the user interface providing different pull-down options relating to the type of physical damage to the production tool, which illustrates the user having selected the pull-down option of "Broken Tip" as a critical data point in relation to the production tool, according to certain embodiments of the present invention.
Figures 7H, 7I:
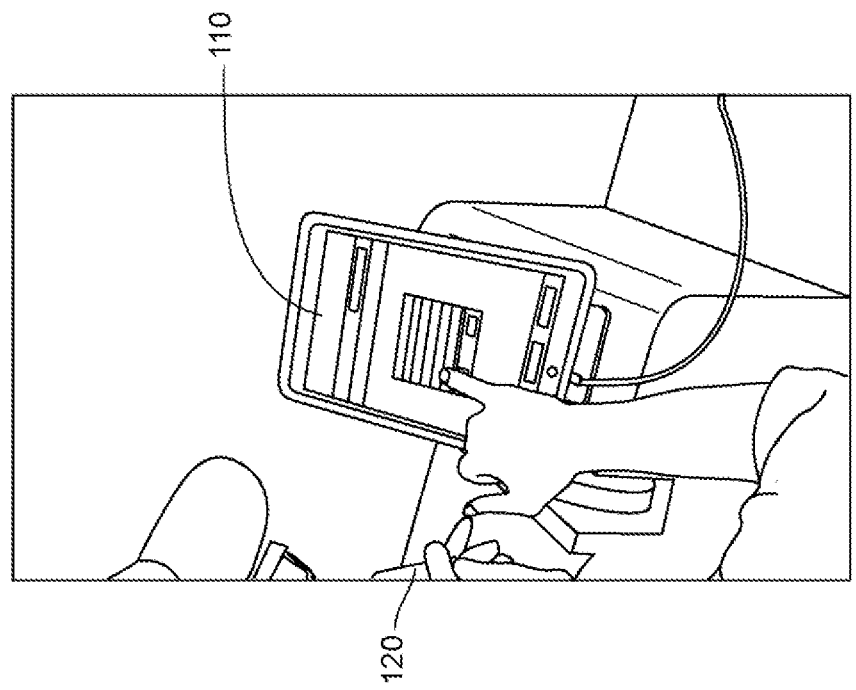
FIG. 7H is a picture of a user with a production tool interacting with the user interface pull-down options after selecting the selectable icon associated with tracking physical damage associated with a respective production tool, wherein the pull-down option allows the user to choose between different types of physical damage to the production tool, according to certain embodiments of the present invention.
FIG. 7I is a corresponding image of the user interface of the device in FIG. 7H, wherein the user interface providing different pull-down options relating to the type of physical damage to the production tool, which illustrates the user having selected the pull-down option of "Missing Tip" as a critical data point in relation to the production tool, according to certain embodiments of the present invention.

In some preferred aspects, an application may be selected on the software interface 115 relating to sharpening of production tool 120, which then initiates the camera and light for scanning asset code 125 of production tool 120, as shown in FIGS. 6A-6H. For instance, as shown in FIG. 6B, "Sharpening Zone" is a selectable icon shown on user interface 115 relating to sharpening production tool 120. Upon selecting the desired selectable icon on user interface 115 on device 110 and then scanning asset code 125, the asset number of production tool 120 is populated by the software of device 110, as shown between FIGS. 6D and 6F. The critical data point relating to sharpening production tool 120 is then captured in real-time upon completion of the task by the user, which is shown by the person completing the sharpening task pressing the task has been done or completed for confirmation.

In some aspects, the sharpening device is configured to be initiated upon device 110 scanning of an asset code 125 of a production tool 120, such that a production tool 120 cannot be sharpened without proper input of the asset number associated with the task of sharpening. The sharpening device may also be configured to shutoff upon the sharpening task being confirmed completed on device 110. For instance, there is a direct feed between device 110 and the sharpening device that operates the on and off operation of the sharpening device. In still some other aspects, the sharpening task is automated, such that the automated sharpening is tracked in real-time by the input of the asset code 125.

In some other aspects, production tool 120 can be sharpened by an automatic sharpener, such as a robotic hand tool sharpening device. In such instances, the automatic sharpener device may have a reader for scanning an asset code 125 of each production tool 120 that is sharpened, such that the automatic sharpener tracks in real-time the sharpening of each respective production tool 120 upon the input of asset code 125 as part of the automatic sharpening process. For instance, automatic sharpener may scan asset code 125 prior to the sharpening, upon completion of sharpening, or both prior to and upon completion of sharpening. The reader for scanning asset code 125 may be provided by another device 110 or another scanning device that has a network integration with other devices 110.

In some other preferred aspects, an application may be selected on the software interface relating to management of production tools 120. For instance, as illustrated in FIGS. 7A-7J, an application may be selected on user interface 115 relating to tracking one or more other events, such physical damage to production tool 120. In some aspects, events that may be tracked include "Missing Tip," "Broken Tip," "Damaged," "Lost," or the like. One of ordinary skill will appreciate that various other desirable events can be tracked in real-time. Upon selecting or otherwise inputting the desired event, asset code 125 can be scanned by device 110, which populates the asset number of production tool 120 in the user interface. The critical data point relating to the event for production 120 can then be captured in real-time upon completion of the task by the user.

In some other aspects, production tool 120 can be evaluated by an automatic evaluation device, such as a sharp edge evaluation device. In such instances, the automatic evaluation device may have a reader for scanning an asset code 125 of each production tool 120 that is evaluated, such that the automatic evaluator tracks in real-time the sharp edge of each respective production tool 120 upon the input of asset code 125 as part of the automatic evaluation process. For instance, automatic evaluation device may scan asset code 125 prior to the evaluation, upon completion of evaluation, or both prior to and upon completion of evaluation. The reader for scanning asset code 125 may be provided by another device 110 or another scanning device that has a network integration with other devices 110. Automatic evaluation device may automatically identify physical damage to the production tool 120, such as burs, broken tips, broken blade, missing handle and the like.

As provided by the foregoing, each asset code 125 assigned to a respective production tool 120 can relate to an asset number maintained in a network database, such that when the asset code 125 is scanned by any device 110 that is part of the network, real-time tracking of each production tool 120 can occur on the network database. The real-time data can be shared between devices 110 on the network. The real-time data can also be shared with other smart-devices, such as smartphones, computers, or tablets, such that the information may be readily accessible to authorized users.

In some aspects, critical data points are capable of being linked to each respective asset number assigned to each production tool 120 in real-time for management, regulatory compliance and/or employee accountability relating to each production tool. In some preferable aspects, the critical data points are capable of being linked to each respective asset number assigned to each production tool 120 and each designated user 130 of the production tool.

In some aspects, the asset code 125 of a production tool 120 is scanned at the time the production tool 120 is assigned for each initial task. Each initial task may comprise the production tool 120 being assigned to a specific employee, such as during the employment of that specific employee and/or the lifetime of that particular production tool 120. In some other instances, the initial task may be the start of a work shift, such that the production tool is checked-out to a production line, production station and/or employee on a periodic basis.

In some aspects, the asset code 125 of a production tool 120 is scanned at the time the assigned production tool is returned. Each production tool may be returned upon the employment of the specific employee that the production tool 120 was assigned ending and/or upon the lifetime of that particular production tool 120 ending. In some other instances, the production tool may be returned upon the end of the work shift, such that the production tool is checked-in from the production line, production station and/or employee upon the completion of the work shift.

In some instances, the production tool 120 may be assigned to a particular production line and/or production station, such that one or more employees over a period of time (various shifts or days) check-out and check-in the respective production tools. In those instances, each respective production tool may be associated with a particular employee during a work shift and then assigned to a different employee during a different shift, such that the production tool can be tracked to a specific employee during each production shift.

In some instances, the production tool may be re-assigned to a different particular production line and/or production station, such as in the situation when the production tool needs to be fixed, sharpened, inspected or otherwise removed from one production line and/or production station and assigned to a different production line and/or production station.

In some other preferable aspects, the production tool may be re-assigned to a different particular production line and/or production station while still being assigned to a particular employee, such as in the situation when the production tool needs to be fixed, sharpened, inspected or otherwise removed from one production line and/or production station and assigned to a different production line and/or production station, but still under the responsibility of that particular employee.

In some aspects, each critical data point is logged in relation to the assigned production line, production station and/or employee. By logging each critical data point, each production tool can be tracked in real-time as it relates to the respective production line, production station and/or employee, as it relates to misplaced, broken and/or damaged production tools to enhance accountability and asset visibility. The real-time tracking of each production tool also allows for automatic alerts to designated individuals, such as management, relating to lost or broken production tools, such that loss mitigation efforts may be undertaken with quicker response times. The real-time tracking can be accomplished by providing the asset code scanning, designated user code scanning and various critical data points into the cloud for simultaneous access by one or more approved devices for tracking or managing the events.

In some aspects, automatic notifications are sent to at least one designated person upon certain high priority events being logged by the software. The high priority events may include broken tips, missing tips, lost items or the like. The software may allow the designated person to receive automatic notifications for certain high priority events and daily or week reports for other events. Exemplary messages are shown in FIG. 7G in relation to a broken tip event and FIG. 7L in relation to a missing tip event. The type of message generated may have various desired information provided in the automatic message, including the company name, order number, employee to which the production tool is checked-out, type of production tool, asset number associated with the production tool, and the reason or event the production tool is being returned, such as broken tip, missing tip, lost, too small, damaged, and the like.

In some aspects, real-time data compilation in relation to each production tool as it relates to the respective production line, production station and/or employee also enables tool control program audit reports based upon compliance regulations, such as Brand Reputation Compliance (BRC) reporting guidelines.

Figure 8A:
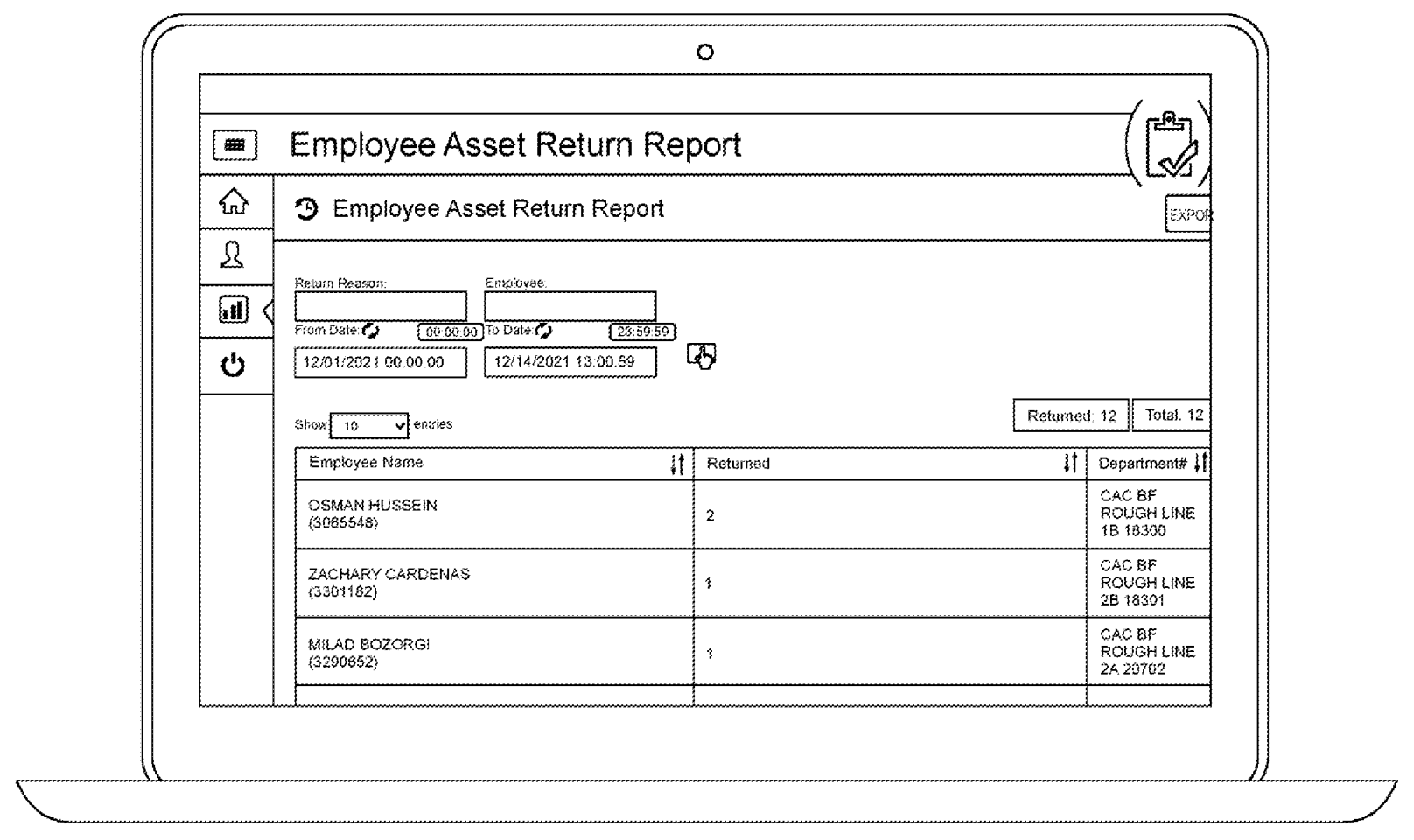

In some aspects, as show in FIG. 8A, real time data analytics can be available relating to the return of production tools by designated users. For instance, the compiled critical data points of production tools returned by specific employees can be filtered based upon a desired scope filtering criteria, such as time, return reason and/or designated user (e.g., employee).

Figure 8B:
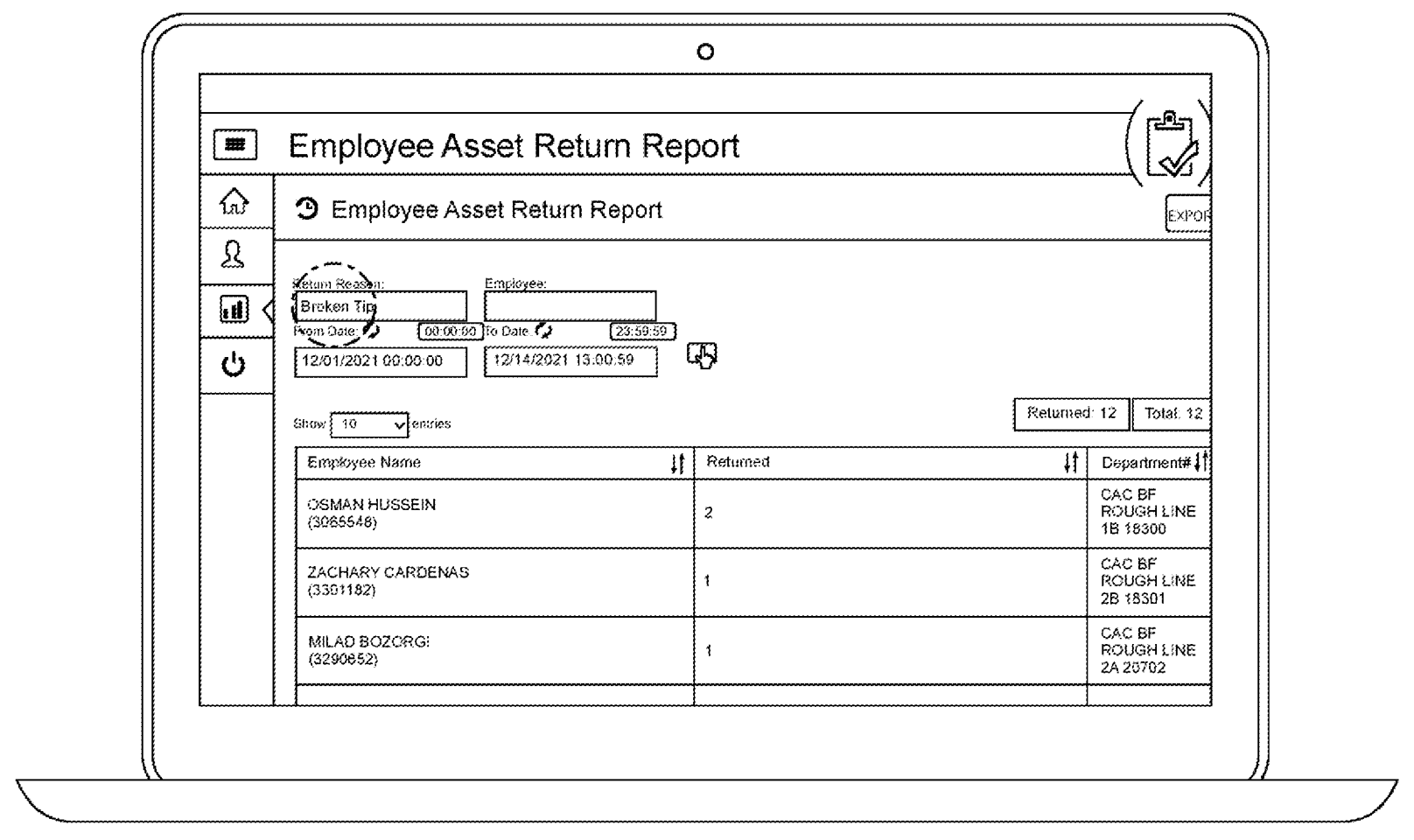

In some aspects, as shown in FIG. 8B, real time data analytics can be available relating to the return of production tools by designated users of FIG. 8A, whereby the compiled critical data points of production tools returned by specific employees can be filtered based upon a desired return reason, such as physical damage (e.g., "Broken Tip", "Missing Tip", etc.), which can be pulled from a drop-down menu of preset return reasons.

Figure 8C:
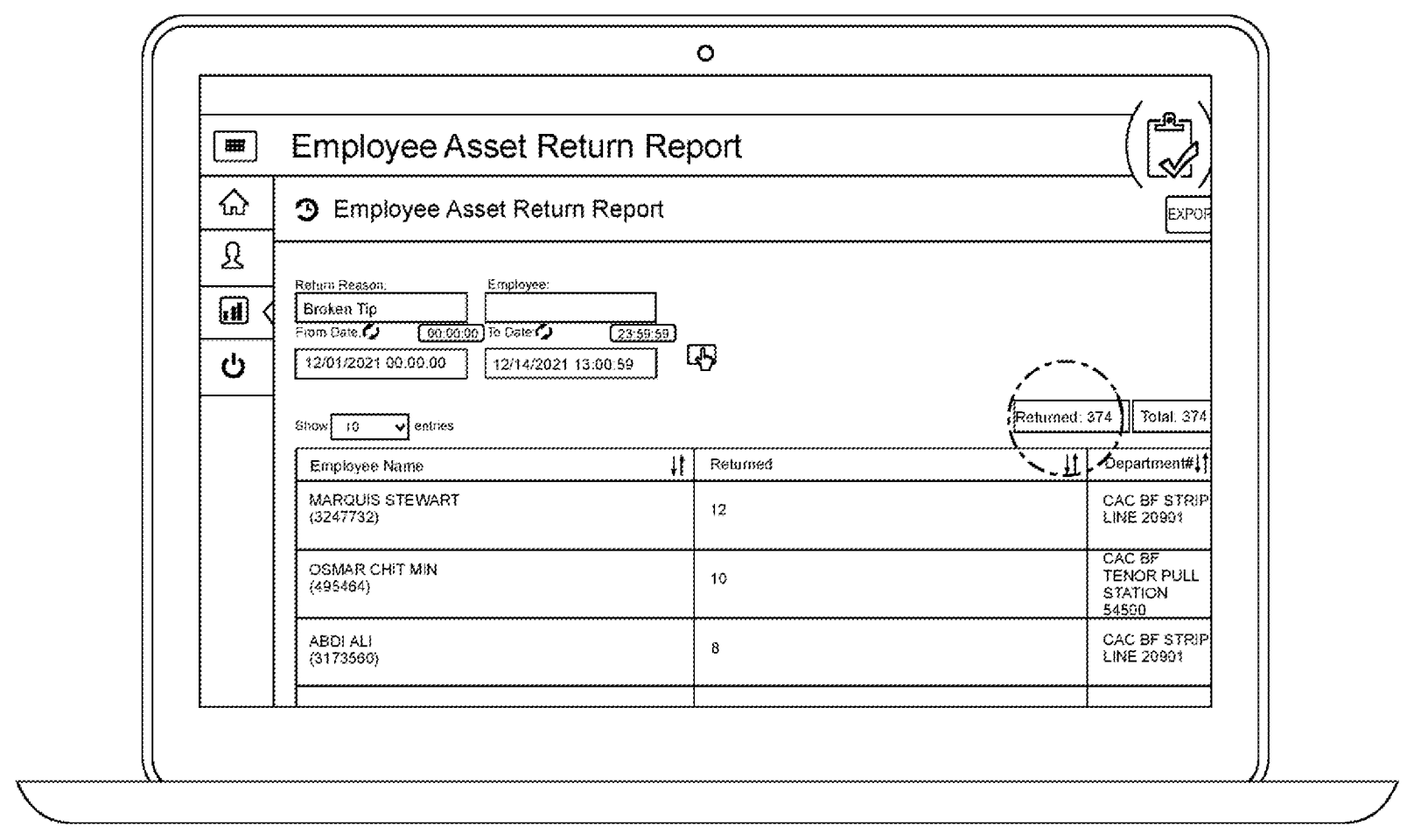

In some aspects, as shown in FIG. 8C, real time data analytics showing the total number of critical data points relating to a specific return reason can be provided. For instance, the total incidents of the specified return reason for the specified date range can be filtered and provided for analysis. For instance, FIG. 8D shows real time data analytics showing the hit results of the critical data points relating to a specific return reason. Real time data analytics showing the hit results of the critical data points relating to a specific return reason can be further filtered to the total incidents of the specified return reason for the specified date range on a designated user (e.g., employee) by designated user basis, as shown in 8E.

Figure 8F:
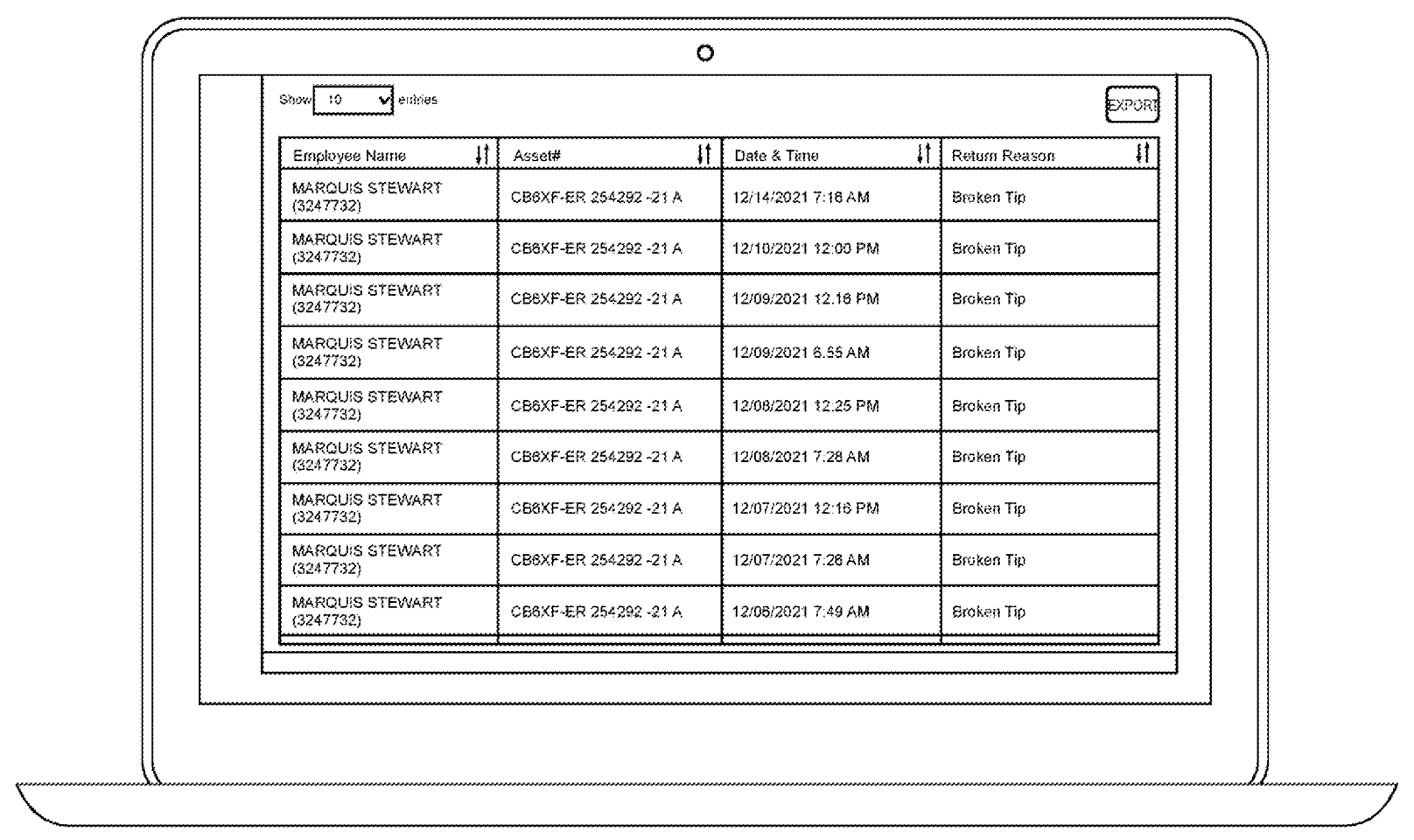

In some aspects, as shown in FIG. 8F, real time data analytics showing the hit results of the critical data points relating to a specific return reason of the respective production tools for a particular designated user (employee), which illustrates the designated user number (employee's user number), the asset number, the logged date and time of the critical data point, and the return reason logged in real-time.

The ability to filter the real time data analytics may help address issues associated with excessive sharpening of production tools 120 by one or more designated users, which reduces the lifetime of the production tool resulting in increased operation costs. The real time data analytics can also improve response times to foreign material investigations, particularly limiting foreign material to a specific part of a food processing facility. The real time data analytics may also be used to identify designated users that may need further training on the proper way to use a production tool, such that the real time data analytics help identify designated users that appear to have repeated physical damage to production tools as a result of improper technique.

In some aspects, the method of using a tool control program of the present disclosure includes providing a production tool having an asset code, providing a device capable of scanning the asset code of the production tool, scanning a user code associated with a designated user for issuance of the production tool, initiating a camera and light on the device, and scanning the asset code of the production tool with the camera of the device a first time, wherein the asset code of the production tool corresponds to an asset number, the user code associated with the designated user correspond to an user number, and scanning the user code followed by scanning the asset code associates the asset number with the user number for real-time tracking.

In some aspects, the user code is an employee QR code or RFID tag, such as that located on an employee badge, such that scanning the user code followed by scanning the asset code associates issuance of the asset number with the employee for real-time tracking.

In some aspects, the asset code is a QR code or RFID tag, such as that located on the production tool, such that scanning the user code followed by scanning the asset code associates issuance of the asset number with the designated user for real-time tracking.

In some aspects, the method further comprises scanning the asset code of the production tool with a camera of a device a second time, wherein the second scanning relates to an event relating to the production tool. In some aspects, the event relates to fixing the production tool, sharpening the production tool, identification of damage to the production tool, identification of a broken tip of the production tool, reporting a missing piece of the production tool, transferring the production tool to a different designated user, re-assigning the production tool to a different designated user, or return of the production tool by the designated user to a return location.

In some aspects, the method further comprises scanning the asset code of the production tool with a camera of a device a second time and a third time, wherein the second scanning relates to an event relating to the production tool other than return of the production tool by the designated user to a return location, and the third scanning relates to the designated user returning of the production tool to a return location. In some aspects, the event of the second scanning relates to fixing the production tool, sharpening the production tool, identification of damage to the production tool, identification of a broken tip of the production tool, reporting a missing piece of the production tool, reporting the production tool as being lost or misplaced, transferring the production tool to a different designated user, or re-assigning the production tool to a different designated user.

In some aspects, the method further comprising providing a real-time notification in relation to one or more of the critical data points. In some aspects, the real-time notification relates to the critical data point chosen from identification of damage to the production tool, identification of a broken tip of the production tool, reporting a missing piece of the production tool, or reporting the production tool as being lost or misplaced. In some aspects, the real-time notification is provided to one or more designated recipients, such as a supervisor, manager, or the like. In some aspects, the real-time notification is an email, text message, automated phone call, smart-device pop-up notification, or the like.

In some aspects, the method further comprises logging each critical data point in relation to the designated user.

In some aspects, the method further comprises running a real-time data analytics report, wherein the real-time data analytics report provides each critical data point in relation to the designated user for one or more production tools. In some aspects, the real-time data analytics report for each critical data point provides the date and time related to the critical data point and a description of each critical data point.

In some aspects, the real-time data analytics report is an electronic report providing an asset return report, wherein the asset return report provides the logged information on the date and time that each production tool was returned by the designated user to a different designated user or a return location. In some aspects, the real-time data analytics report is an electronic report providing a reason for return for each production tool, wherein the reason for return may be damage to the production tool, broken tip of the production tool, missing piece of the production tool and/or return of the production tool to a return location.

In some aspects, the production tool is a knife, scissors or hook and the real-time data analytics report is an electronic report providing each critical data point relating to the production tool being sharpened.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions. The system, device and methods disclosed and claimed herein can comprise, consist of, or consist essentially of the essential elements and limitations of that described herein Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art.

Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of capturing real-time data of one or more critical data points relating to each sharp edge production tool associated with a designated user, the method comprising:
   providing one or more sharp edge production tools, each sharp edge production tool having an asset code, wherein each sharp edge production tool is chosen from a knife, scissors, scalpel, shears and hook;
   providing a device capable of inputting the asset code associated with each sharp edge production tool, wherein the device comprises a data management software;
   inputting a user code into the data management software via the device, the user code associated with a designated user for issuance of the one or more sharp edge production tools; and
   inputting the asset code of each sharp edge production tool into the data management software via the device in relation to an issuance event of each sharp edge production tool to the designated user;
   wherein the asset code of the each sharp edge production tool corresponds to an asset number, the user code associated with the designated user corresponds to a designated user number, and the asset code of the each sharp edge production tool input into the data management software via the device associates each asset number with the designated user number as an issuance critical data point in the data management software in real-time by at least date and time.

2. The method of claim 1, further comprising initiating a camera on the device, such that the camera is capable of scanning the asset code of each sharp edge production tool to input the respective asset code of each sharp edge production tool into the data management software in relation to the issuance event.

3. The method of claim 2, further comprising initiating a light on the device, such that the light enhances a time to scan the asset code of each sharp edge production tool.

4. The method of claim 3, wherein the camera and light are automatically initiated by the data management software.

5. The method of claim 4, wherein the data management software provides a user interface on the device.

6. The method of claim 5, wherein the camera and light are automatically initiated by a selection of an application on the user interface.

7. The method of claim 3, wherein the camera and light are automatically initiated by the input of the designated user code.

8. The method of claim 1, wherein the user code is an employee QR code or RFID tag associated with an employee badge.

9. The method of claim 1, wherein each asset code is a QR code or RFID tag proximately located on the respective sharp edge production tool.

10. The method of claim 1, wherein the one or more sharp edge production tools is at least one knife.

11. The method of claim 1, wherein the asset code of each sharp edge production tool is permanently affixed to the respective sharp edge production tool.

12. The method of claim 11, wherein the asset code is etched into a portion of the respective sharp edge production tool.

13. The method of claim 1, wherein each asset number is a numerical number, alphabet number or alpha-numerical number.

14. The method of claim 1, wherein each designated user number is a numerical number, alphabet number or alpha-numerical number.

15. The method of claim 1, wherein each critical data point is capable of being linked to each asset number assigned to each respective sharp edge production tool in real-time for management, regulatory compliance and/or employee accountability relating to each sharp edge production tool.

16. The method of claim 1, further comprising scanning the asset code of each sharp edge production tool in relation to a return event of the respective sharp edge production tool, wherein scanning the asset code associates the asset number with the designated user number as a return critical data point in the data management software in real-time by at least date and time, and wherein scanning the asset code in relation to the return event of the respective sharp edge production tool can be conducted with the device or a first different device connected to the data management software via a network.

17. The method of claim 16, further comprising scanning the asset code of each sharp edge production tool in relation to at least one event of the respective sharp edge production tool, wherein scanning the asset code associates the asset number with the designated user number as an event critical data point in the data management software in real-time by at least date and time, and wherein scanning the asset code in relation to the event of the respective sharp edge production tool can be conducted with the device, the first different device, or a second different device connected to the network.

18. The method of claim 17, wherein the at least one event of the respective sharp edge production tool relates to fixing the respective sharp edge production tool, sharpening the respective sharp edge production tool, recording physical damage to the respective sharp edge production tool, recording a missing piece of the respective sharp edge production tool, recording a broken tip of the respective sharp edge production tool, recording the respective sharp edge production tool being lost, recording the respective sharp edge production tool being transferred to a different designated user, or recording the respective sharp edge production tool being reassigned to a different designated user.

19. The method of claim 18, further comprising providing a real-time notification to a designated recipient in relation to the at least one event of the respective sharp edge production tool.

20. The method of claim 18, further comprising providing a real-time data analytics report from the network in relation to the respective sharp edge production tool, wherein the real-time data analytics report comprises the at least one event of the respective sharp edge production tool in relation to the designated user.

21. A system configured to capture real-time data of one or more critical data points relating to each sharp edge production tool associated with a respective designated user, the system comprising:

one or more devices connected to a data management software via a network and comprising a camera capable of scanning a QR code or RFID tag, the data management software configured to log a user code into the data management software from the respective QR code or RFID tag associated with each designated user, the data management software configured to log into the data management software an asset code from the respective QR code or RFID tag associated with each sharp edge production tool chosen from a knife, scissors, scalpel, shears and hook;

wherein the asset code of each respective sharp edge production tool corresponds to an asset number, and the user code associated with the designated user corresponds to a designated user number input into the data management software;

wherein each asset code scanned an initial time by the one or more devices associates the asset number with the designated user number input into the data management software as an issuance critical data point in the data management software in real-time by at least date and time;

wherein each asset code optionally scanned an intermediate time by the one or more devices associates the asset number with the designated user number as an event critical data point in the data management software in real-time by at least date and time; and wherein each asset code scanned a final time by the one or more devices associates the asset number with the designated user number as a return critical data point in the data management software in real-time by at least date and time.

\* \* \* \* \*